(12) United States Patent
Yang et al.

(10) Patent No.: US 9,696,551 B2
(45) Date of Patent: Jul. 4, 2017

(54) INFORMATION PROCESSING METHOD AND ELECTRONIC DEVICE

(71) Applicants: Beijing Lenovo Software Ltd., Beijing (CN); Lenovo (Beijing) Limited, Beijing (CN)

(72) Inventors: Bin Yang, Beijing (CN); Yongliang Wang, Beijing (CN); Shoupeng Zhang, Beijing (CN); Chen Chen, Beijing (CN); Wenfeng Wang, Beijing (CN); Nailei Zhang, Beijing (CN); Sixiang Liu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 28 days.

(21) Appl. No.: 14/673,270

(22) Filed: Mar. 30, 2015

(65) Prior Publication Data

US 2016/0048024 A1    Feb. 18, 2016

(30) Foreign Application Priority Data

Aug. 13, 2014 (CN) .......................... 2014 1 0397447
Sep. 9, 2014 (CN) .......................... 2014 1 0455741
Nov. 3, 2014 (CN) .......................... 2014 1 0608506

(51) Int. Cl.
*G02B 27/01* (2006.01)
*G06F 3/01* (2006.01)

(52) U.S. Cl.
CPC ......... *G02B 27/0172* (2013.01); *G06F 3/017* (2013.01); *G02B 2027/014* (2013.01);
(Continued)

(58) Field of Classification Search
CPC .................... G02B 27/01–27/0189; G02B 2027/0105–2027/0198; G06F 3/017
See application file for complete search history.

(56) References Cited

U.S. PATENT DOCUMENTS 4,711,544 A * 12/1987 Iino .................. G02B 27/01
345/7
5,451,976 A * 9/1995 Ito .................. G02B 27/017
345/8

(Continued)

FOREIGN PATENT DOCUMENTS

CN    103049471 A    4/2013

OTHER PUBLICATIONS

"Chinese Application No. 201410608506.0, Office Action mailed Feb. 4, 2017", w/ English Translation, (Feb. 4, 2017), 10 pgs.

*Primary Examiner* — Patrick F Marinelli
(74) *Attorney, Agent, or Firm* — Schwegman Lundberg & Woessner, P.A.

(57) ABSTRACT

The disclosure discloses an information processing method and an electronic device. The information processing method comprises: acquiring a second image; analyzing the second image to determine a second display parameter of the second image; determining, based on the second display parameter of the second image, a first display parameter of the display content to be presented, so as to make the difference between the first display parameter of the display content and the second display parameter of the second image greater than a threshold; and presenting the display content with the first display parameter.

17 Claims, 23 Drawing Sheets

(52) U.S. Cl.
CPC ............... *G02B 2027/0112* (2013.01); *G02B 2027/0138* (2013.01); *G02B 2027/0178* (2013.01); *G09G 2320/0613* (2013.01); *G09G 2320/0626* (2013.01); *G09G 2320/0666* (2013.01)

(56) References Cited

U.S. PATENT DOCUMENTS

| | | | | |
|---|---|---|---|---|
| 6,040,945 A * | 3/2000 | Karasawa | ......... | G02B 27/0172 348/E5.145 |
| 6,417,970 B1 * | 7/2002 | Travers | ............. | G02B 27/0081 359/630 |
| 7,487,468 B2 * | 2/2009 | Tanaka | .................. | H04N 5/272 345/156 |
| 8,294,994 B1 * | 10/2012 | Kelly | ................ | G02B 27/0172 359/630 |
| 8,508,830 B1 * | 8/2013 | Wang | ................... | G02B 3/0006 359/267 |
| 8,558,759 B1 * | 10/2013 | Prada Gomez | ........ | G06F 3/017 345/156 |
| 8,701,028 B2 * | 4/2014 | Kokemohr | ......... | G06F 3/04845 715/768 |
| 8,767,306 B1 * | 7/2014 | Miao | ................. | G02B 27/0172 359/629 |
| 8,847,850 B1 * | 9/2014 | Cho | .................... | G02B 27/017 345/7 |
| 8,881,051 B2 * | 11/2014 | Frey | ..................... | G06F 3/0485 715/716 |
| 8,957,916 B1 * | 2/2015 | Hedman | ............... | G09G 3/003 345/633 |
| 9,076,033 B1 * | 7/2015 | Barron | .............. | G06K 9/00355 |
| 9,110,502 B2 * | 8/2015 | Fink | .................. | G06F 3/012 |
| 9,116,337 B1 * | 8/2015 | Miao | ................ | G02B 27/0172 |
| 9,161,000 B2 * | 10/2015 | Zhang | .................... | H04N 5/58 |
| 9,473,687 B2 * | 10/2016 | Luk | ................... | H04N 5/23206 |
| 2001/0048561 A1 * | 12/2001 | Heacock | .......... | G02B 27/0172 359/631 |
| 2007/0294634 A1 * | 12/2007 | Kokemohr | ......... | G06F 3/04845 715/781 |
| 2009/0174946 A1 * | 7/2009 | Raviv | ............... | G02B 27/0176 359/632 |
| 2009/0228841 A1 * | 9/2009 | Hildreth | ............... | G06F 3/0304 715/863 |
| 2009/0284604 A1 * | 11/2009 | Lee | .......................... | H04N 9/73 348/181 |
| 2009/0303209 A1 * | 12/2009 | Teng | ....................... | G09G 3/20 345/204 |
| 2012/0249416 A1 * | 10/2012 | Maciocci | ............... | G06F 3/011 345/156 |
| 2012/0280903 A1 * | 11/2012 | Fink | ........................ | G06F 3/012 345/156 |
| 2013/0016413 A1 * | 1/2013 | Saeedi | .................. | G02B 27/01 359/205.1 |
| 2013/0021374 A1 * | 1/2013 | Miao | ...................... | G06F 3/011 345/633 |
| 2013/0128611 A1 * | 5/2013 | Akutsu | .................... | G02B 5/09 362/607 |
| 2013/0293580 A1 * | 11/2013 | Spivack | ............. | G06Q 30/0643 345/633 |
| 2013/0300899 A1 * | 11/2013 | Tamura | ................ | H04N 5/2351 348/234 |
| 2013/0335573 A1 * | 12/2013 | Forutanpour | ........... | G06F 3/011 348/158 |
| 2014/0055481 A1 * | 2/2014 | Gao | ........................ | G09G 5/02 345/589 |
| 2014/0118576 A1 * | 5/2014 | Du | ...................... | H04N 5/23212 348/239 |
| 2014/0225918 A1 * | 8/2014 | Mittal | ..................... | G06F 3/017 345/633 |
| 2014/0240225 A1 * | 8/2014 | Eilat | ....................... | G06F 3/011 345/156 |
| 2014/0250396 A1 * | 9/2014 | Kokemohr | .......... | G06F 3/04845 715/768 |
| 2014/0292637 A1 * | 10/2014 | Peng | .................. | G02B 27/0172 345/156 |
| 2014/0354602 A1 * | 12/2014 | He | .......................... | G06F 3/017 345/175 |
| 2014/0361988 A1 * | 12/2014 | Katz | ........................ | G06F 3/011 345/156 |
| 2014/0375669 A1 * | 12/2014 | Zhang | ..................... | G09G 5/02 345/589 |
| 2015/0042559 A1 * | 2/2015 | Li | ......................... | G06F 3/1438 345/156 |
| 2015/0062350 A1 * | 3/2015 | Zhang | ..................... | H04N 5/58 348/180 |
| 2015/0130833 A1 * | 5/2015 | Mao | ........................ | G06T 11/60 345/632 |
| 2015/0153572 A1 * | 6/2015 | Miao | .................... | G02B 27/017 345/8 |
| 2016/0034039 A1 * | 2/2016 | Maeda | .................... | G06F 3/011 715/810 |
| 2016/0048024 A1 * | 2/2016 | Yang | .................. | G02B 27/0172 345/8 |
| 2016/0048038 A1 * | 2/2016 | Ho | ........................... | G02C 7/14 351/159.45 |
| 2016/0091964 A1 * | 3/2016 | Iyer | ...................... | G02B 27/017 345/633 |
| 2016/0109957 A1 * | 4/2016 | Takashima | .............. | G06F 1/163 345/8 |
| 2016/0182801 A1 * | 6/2016 | Luk | .................... | H04N 5/23206 348/207.11 |
| 2017/0013189 A1 * | 1/2017 | Luk | .................... | H04N 5/23206 |

* cited by examiner

INFORMATION PROCESSING METHOD AND ELECTRONIC DEVICE

PRIORITY APPLICATIONS

This application claims the benefit under 35 U.S.C. 119 to Chinese Application No. 201410397447.7, filed on 13 Aug. 2014; and claims the benefit under 35 U.S.C. 119 to Chinese Application No. 201410455741.9, filed on 9 Sep. 2014, and claims the benefit under 35 U.S.C. 119 to Chinese Application No. 201410608506.0, filed 3 Nov. 2014; which applications are incorporated herein by reference in their entirety.

TECHNICAL FIELD

The present disclosure relates to an information processing technology, and particularly to an information processing method and an electronic device.

BACKGROUND

Currently, electronic devices are more and more widely used. Many electronic devices, such as a digital camera, a digital video recorder, a mobile phone, a tablet computer, smart glasses and the like, are provided with display units. For example, a reality environment can be presented on the display unit by an image acquisition unit of the electric device or can be viewed through the lens of smart glasses, while contents, such as texts, pictures etc., can still be presented on the display unit. There are some cases which is not convenient for the user to view the content displayed on the display unit and the reality environment in a best mode. For example, the content displayed on the display unit and the scene of the reality environment may interfere with each other, so that objects with similar color are invisible or are uncomfortable or inconvenient for the user to view. Or, as another example, the user cannot view the contents presented on the display unit comfortably. Therefore it is desired that the user can promptly and smartly adjust the display content to achieve the best viewing experience.

SUMMARY

Embodiments of the disclosure provide an information processing method and an electronic device.

An information processing method provided by an embodiment of the disclosure comprises:
  acquiring a second image;
  analyzing the second image to determine a second display parameter of the second image;
  determining, based on the second display parameter of the second image, a first display parameter of the display content to be presented, so as to make the difference between the first display parameter of the display content and the second display parameter of the second image greater than a threshold; and
  presenting the display content with the first display parameter.

Preferably, the first display parameter and the second display parameter respectively comprises: color, color temperature, hue, brightness or saturation. For example, the color parameter comprises: brightness of red lights, brightness of green lights and brightness of blue lights.

Preferably, said analyzing the second image to determine a second display parameter of the second image comprises: obtaining an average value of the color parameters of pixels in the second image; and, determining the average value as the second display parameter of the second image.

It should be noted that the display content is sometimes called as "the first image" hereafter, which can be exchangeable used.

An electronic device provided by an embodiment of the disclosure comprises:
  an image acquisition unit, configured for acquiring a second image; and a processor, configured for:
    analyzing the second image to determine a second display parameter of the second image;
    determining, based on the second display parameter of the second image, a first display parameter of the display content to be presented, so as to make the difference between the first display parameter of the display content and the second display parameter of the second image greater than a threshold; and
    presenting the display content with the first display parameter.

Preferably, the processor is further configured for: obtaining an average value of the color parameters of pixels in the second image; and determining the average value as the second display parameter of the second image.

In embodiments of the disclosure, the portable electronic device may further have a bracket. The portable electronic device can be worn on the head of the user by using the bracket. The portable electronic device also has a projection unit and a lens module. By using the projection unit and the lens module, lights for forming a display content can be projected onto the eye of the user of the electronic device, so as to make the user view the display content. The display content is a virtual interface. The display content is displayed and superimposed over the reality interface. What the user actually views is a superimposed image of the display content and the reality interface. In order to improve effect for superimposing the display content and the reality interface, the embodiment of the disclosure acquires a second image (i.e. the display interface) of a target object using the image acquisition unit mounted in the portable electronic device, analyzes the second image to determine a second display parameter of the second image, and then determines a first display parameter of the display content based on the second display parameter of the second image, so as to make the difference between the first display parameter of the display content and the second display parameter of the second image greater than a threshold. For example, the lights for forming the display content may be adjusted according to the first display parameter of the display content, so as to make the display content displayed with the first display parameter and superimposed over the second image. As such, the superimposing of the display content and the second image can reach a predetermined display effect, which in turn makes the user well distinguishing the virtual interface and the reality interface, improving the user's experience.

Assume the electronic device is a portable electric device, such as a camera, and the display content is prompt information. First, a display area on the display unit (i.e. the second image in the above solution) for displaying the prompt information is determined. Then the second image is analyzed to determine a second display parameter of the second image. For example, the current color parameter of the pixels in the display area is determined, and then the color parameter of the prompt information is determined based on the current color parameter of the pixels in the display area, so as to make the difference between the color parameter of the prompt information and the color parameter of the display area greater than a threshold. Thus, the display unit may be controlled to display the prompt information with the determined color parameter in the display area. Based on the image processing method disclosed in the disclosure, the color parameter of the prompt information is not fixed, but depends on the color parameter of the display area on the display unit. In addition, the difference between the color parameter of the prompt information and the color parameter of the display area are greater than the threshold, which results in a greater difference in color between the prompt information and the display area, ensuring that the user can view the prompt information clearly.

The information processing method provided by the embodiments of the disclosure may further comprise:

detecting a first gesture operation moving along a first direction;

identifying the first gesture operation to determine an adjusting parameter for adjusting the display content;

generating an adjusting instruction based on the adjusting parameter;

in response to the adjusting instruction, emitting, from a projection unit of an electronic device, lights for forming the display content according to the adjusting parameter, the lights being projected onto a lens module of the electronic device so as to make the user view the adjusted display content on an visual focus, wherein the visual focus is the imaging location of the display content viewed by the user through the lens module.

The processor comprised in the electronic device provided by the embodiments of the disclosure is further configured for:

detecting a first gesture operation moving along a first direction;

identifying the first gesture operation to determine an adjusting parameter for adjusting the display content;

generating an adjusting instruction based on the adjusting parameter;

in response to the adjusting instruction, emitting, from a projection unit of an electronic device, lights for forming the display content according to the adjusting parameter, the lights being projected onto a lens module of the electronic device so as to make the user view the adjusted display content on an visual focus, wherein the visual focus is the imaging location of the display content viewed by the user through the lens module.

In solutions of embodiments of the disclosure, the portable electronic device may further have a bracket. The portable electronic device can be worn on the head of the user by using the bracket. The portable electronic device also has a projection unit and a lens module. By using the projection unit and the lens module, lights for forming a display content can be projected onto the eye of the user of the electronic device, so as to make the user view the display content. In the embodiments of the disclosure, the size of the display content viewed by the user is adjustable. In particular, the solution of the disclosure comprises: first, detecting a first gesture operation for adjusting a first display window for the display content; then, identifying the first gesture operation so as to generate an identifying result representing an adjusting parameter for adjusting the first display window for the display content; finally, adjusting the first display window according to the adjusting parameter, and displaying, in the adjusted window (i.e. the second display window), the content in the first display window. As such, the user can freely adjust the size of the virtual interface via a gesture, according to different scenarios or user preferences, improving the user's experience.

DETAILED DESCRIPTION

In the following, the disclosure will be described in further detail in conjunction with the drawings and embodiments.

In order to make a more comprehensive understanding of features and solutions of embodiments of the disclosure, in the following, the embodiments of the disclosure will be illustrated in details by referring to accompanying drawings, which is only for illustrating rather than limiting the disclosure.

Figure 1:
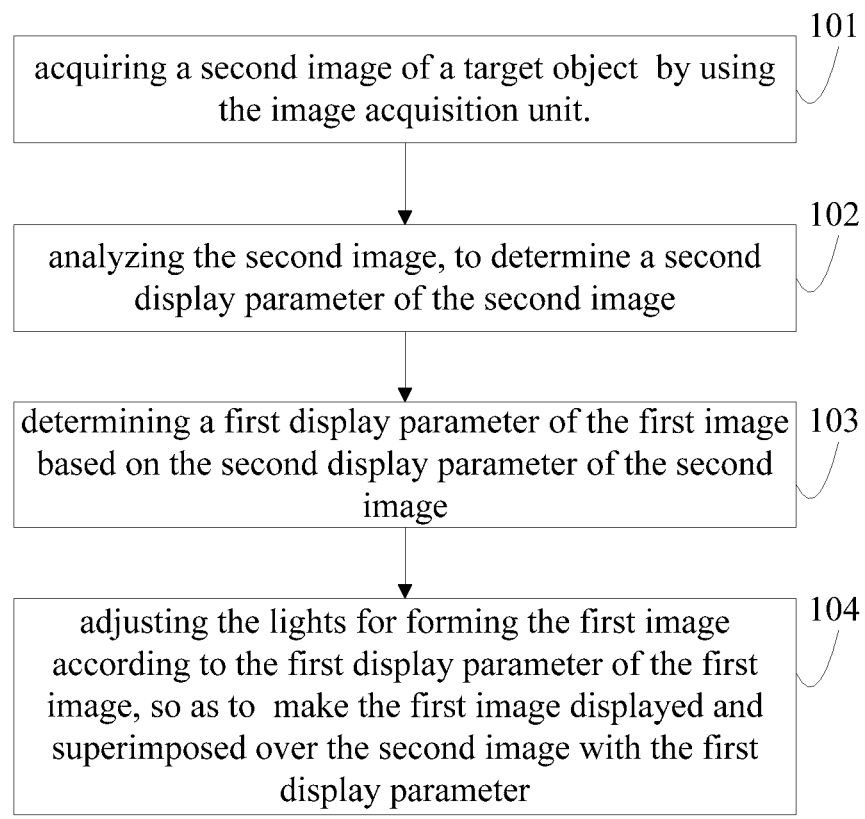
FIG. 1 shows a schematic flowchart illustrating an information processing method according to a first embodiment of the disclosure.

FIG. 1 shows a schematic flowchart illustrating an information processing method according to the first embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter on the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 1, said information processing method comprises the following steps.

In step 101, a second image of a target object is acquired. Step 101 may be implemented by using the image acquisition unit.

Figure 13:
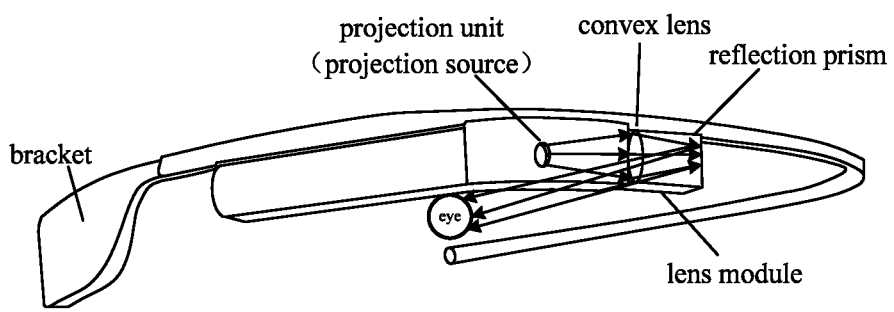
FIG. 13 shows a schematic stereogram of a portable electronic device according to an embodiment of the disclosure.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

Figure 14:
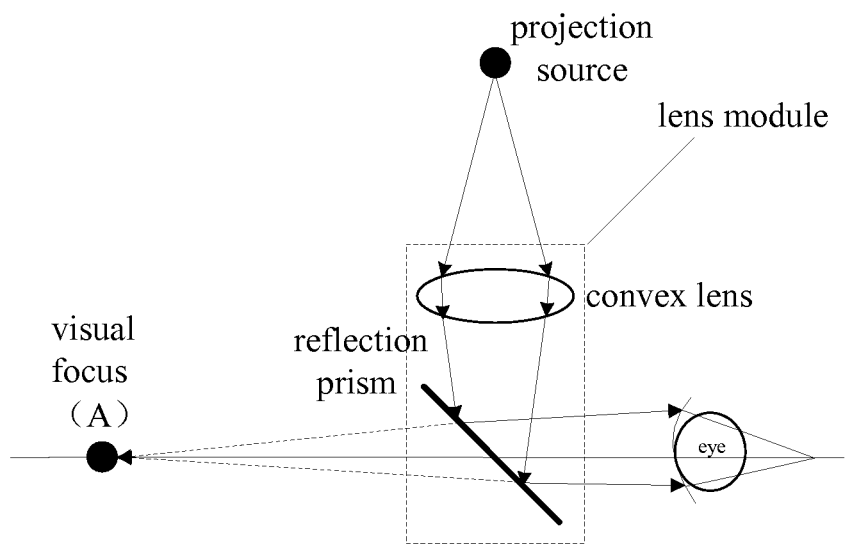
FIG. 14 shows a schematic diagram of the optical path according to an embodiment of the disclosure

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 102, the second image is analyzed, to determine a second display parameter of the second image.

In the embodiment of the disclosure, the second display parameter represents at least one of the following information of the second image: color information, and color temperature information. In particular, the image acquisition unit can acquire Red/Green/Blue (R/G/B) information, i.e. color information, of the second image. The image acquisition unit can also acquire spectroscopic data of the first image. Here, the spectroscopic data represents the correspondences between the light intensities and wavelengths. Corresponding color temperature information can be computed based on the spectroscopic data. The greater the proportion of blue in the second image is, the higher the color temperature is. The greater the proportion of red is, the lower the color temperature is.

In step 103, a first display parameter of the first image is determined based on the second display parameter of the second image, so as to make the difference between the first display parameter of the first image and the second display parameter of the second image greater than a threshold.

In the embodiment of the disclosure, the first display parameter represents at least one of the following information of the first image: color information, and color temperature information.

In the embodiment of the disclosure, in case that the first display parameter represents the color information of the first image, a default display parameter of the first image, which is displayed with the default display parameter, is compared with the second display parameter of the second image, so as to obtain a first comparison result. In case that the first comparison result indicates that the difference between the default display parameter and the second display parameter is less than or equal to a first predetermined value, the default display parameter of the first image is adjusted to the first display parameter, in order to make the difference between the first display parameter of the first image and the second display parameter of the second image greater than or equal to the first predetermined value. For example, the default display parameter of the first image represents that the proportion of blue in the first image is 80%, while the second display parameter of the second image represents that the proportion of blue in the second image is 70%. Then, the proportion of blue in the first image and the proportion of blue in the second image differ by 10%, which is less than the predetermined value of 50%. Thus, the default display parameter of the first image can be adjusted to the first display parameter, which has a value of 20%. As such, the proportion of blue in the first image and the proportion of blue in the second image differ by 60%, which is greater than the predetermined value of 50%. For another example, the default display parameter of the first image represents the gray value of the first image, while the second display parameter of the second image represents the gray value of the second image. When the difference between the gray value of the first image and the gray value of the first image is less than or equal to a first determined value, the default display parameter of the first image can be adjusted to the first display parameter, in order to make the difference between the gray value of the first image and the grey value of the second image greater than the first predetermined value. As such, the two images will have a desirable contrast.

In the embodiment of the disclosure, in case that the first display parameter represents color temperature information of the first image, the value of the color temperature of the second image is computed according to the second display parameter of the second image. The value of the color temperature of the first image is determined according to the value of the color temperature of the second image. The first display parameter of the first image is determined according to the value of the color temperature of the first image. In particular, the value of the color temperature of the second image is computed according to the spectroscopic data of the second image. When the user wants the two images to be viewed with a larger contrast, the color temperature of the first image can be adjusted to a value farther away from the value of the color temperature of the second image. When the user wants the two images to be viewed more softly, the color temperature of the first image can be adjusted to a value closer to the value of the color temperature of the second image. Then, lights of certain wavebands in the first image are filtered out according to the value of the color temperature of the first image, so as to obtain the first display parameter of the first image. Here, the lights of certain wavebands in the first image can be filtered out by using a filter.

Optionally, the method may further comprise a step 104. In step 104, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter. As such, the superimposing of the display content and the second image can reach a predetermined display effect, which in turn makes the user well distinguishing the virtual interface and the reality interface, improving the user's experience.

Figure 2:
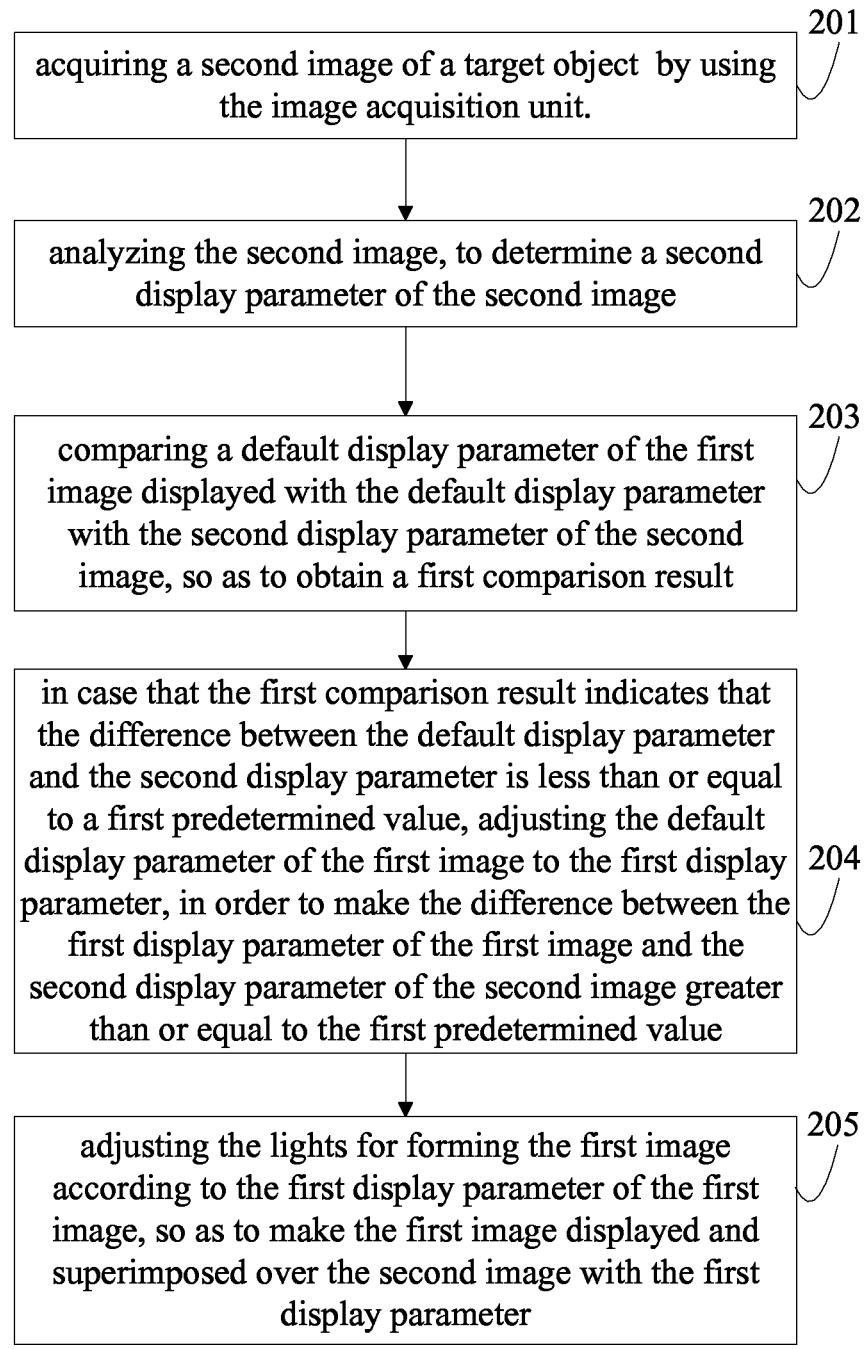
FIG. 2 shows a schematic flowchart illustrating an information processing method according to a second embodiment of the disclosure.

FIG. 2 shows a schematic flowchart illustrating an information processing method according to the second embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 2, said information processing method comprises the following steps.

In step 201, a second image of a target object is acquired. Step 201 may be implemented by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 202, the second image is analyzed, to determine a second display parameter of the second image.

In the embodiment of the disclosure, the second display parameter represents color information of the second image. Specifically, the image acquisition unit can acquire Red/Green/Blue (R/G/B) information, i.e. color information, of the second image.

In step 203, a default display parameter of the first image, which is displayed with the default display parameter, is compared with the second display parameter of the second image, so as to obtain a first comparison result.

In the embodiment of the disclosure, the default display parameter represents default color information of the first image.

In step 204, in case that the first comparison result indicates that the difference between the default display parameter and the second display parameter is less than or equal to a first predetermined value, the default display parameter of the first image is adjusted to the first display parameter, in order to make the difference between the first display parameter of the first image and the second display parameter of the second image greater than or equal to the first predetermined value.

In the embodiment of the disclosure, the first display parameter represents color information of the first image.

In the embodiment of the disclosure, in case that the first display parameter represents the color information of the first image, a default display parameter of the first image, which is displayed with the default display parameter, is compared with the second display parameter of the second image, so as to obtain a first comparison result. In case that the first comparison result indicates that the difference between the default display parameter and the second display parameter is less than or equal to a first predetermined value, the default display parameter of the first image is adjusted to the first display parameter, in order to make the difference between the first display parameter of the first image and the second display parameter of the second image greater than or equal to the first predetermined value. For example, the default display parameter of the first image represents that the proportion of blue in the first image is 80%, while the second display parameter of the second image represents that the proportion of blue in the second image is 70%. Then, the proportion of blue in the first image and the proportion of blue in the second image differ by 20%, which is less than the predetermined value of 50%. Thus, the default display parameter of the first image can be adjusted to the first display parameter, which has a value of 20%. As such, the proportion of blue in the first image and the proportion of blue in the second image differ by 60%, which is greater than the predetermined value of 50%. For another example, the default display parameter of the first image represents the gray value of the first image, while the second display parameter of the second image represents the gray value of the second image. When the difference between the gray value of the first image and the gray value of the first image is less than or equal to a first determined value, the default display parameter of the first image can be adjusted to the first display parameter, in order to make the difference between the gray value of the first image and the grey value of the second image greater than the first predetermined value. As such, the two images will have a desirable contrast.

In step 205, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter. As such, the superimposing of the display content and the second image can reach a predetermined display effect, which in turn makes the user well distinguishing the virtual interface and the reality interface, improving the user's experience.

Figure 3:
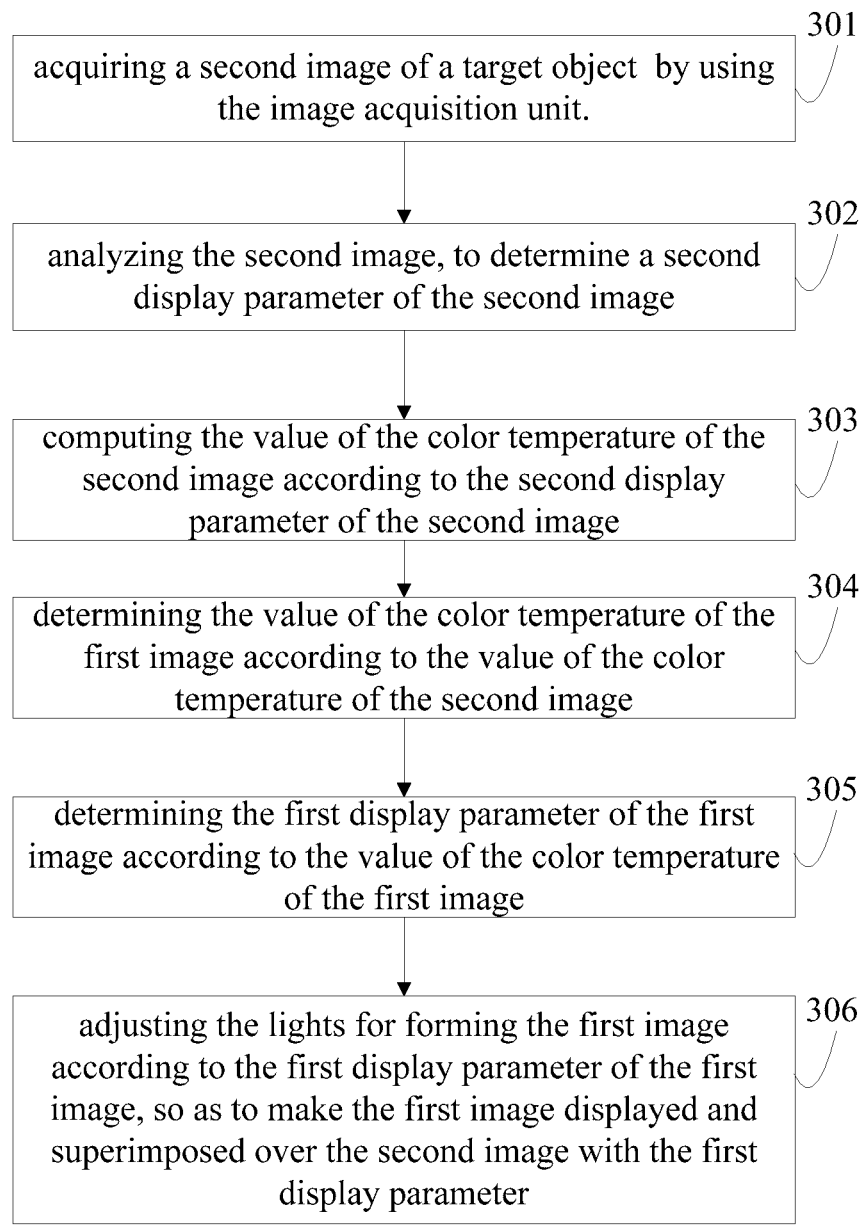
FIG. 3 shows a schematic flowchart illustrating an information processing method according to a third embodiment of the disclosure.

FIG. 3 shows a schematic flowchart illustrating an information processing method according to the third embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 3, said information processing method comprises the following steps.

In step 301, a second image of a target object is acquired. Step 301 may be implemented by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 302, the second image is analyzed, to determine a second display parameter of the second image.

In the embodiment of the disclosure, the second display parameter represents color temperature information of the second image. Specifically, the image acquisition unit can acquire spectroscopic data of the first image. Here, the spectroscopic data represents the correspondences between the light intensities and wavelengths. Corresponding color temperature information can be computed based on the spectroscopic data. The greater the proportion of blue in the second image is, the higher the color temperature is. The greater the proportion of red is, the lower the color temperature is.

In step 303, the value of the color temperature of the second image is computed according to the second display parameter of the second image.

In step 304, the value of the color temperature of the first image is determined according to the value of the color temperature of the second image.

In step 305, the first display parameter of the first image is determined according to the value of the color temperature of the first image.

In the embodiment of the disclosure, the first display parameter represents color temperature information of the first image.

In the embodiment of the disclosure, in case that the first display parameter represents color temperature information of the first image, the value of the color temperature of the second image is computed according to the second display parameter of the second image. The value of the color temperature of the first image is determined according to the value of the color temperature of the second image. The first display parameter of the first image is determined according to the value of the color temperature of the first image. In particular, the value of the color temperature of the second image is computed according to the spectroscopic data of the second image. When the user wants the two images to be viewed with a larger contrast, the color temperature of the first image can be adjusted to a value farther away from the value of the color temperature of the second image. When the user wants the two images to be viewed more softly, the color temperature of the first image can be adjusted to a value closer to the value of the color temperature of the second image. Then, lights of certain wavebands in the first image are filtered out according to the value of the color temperature of the first image, so as to obtain the first display parameter of the first image. Here, the lights of certain wavebands in the first image can be filtered out by using a filter.

In step 306, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter. As such, the superimposing of the display content and the second image can reach a predetermined display effect, which in turn makes the user well distinguishing the virtual interface and the reality interface, improving the user's experience.

Figure 4:
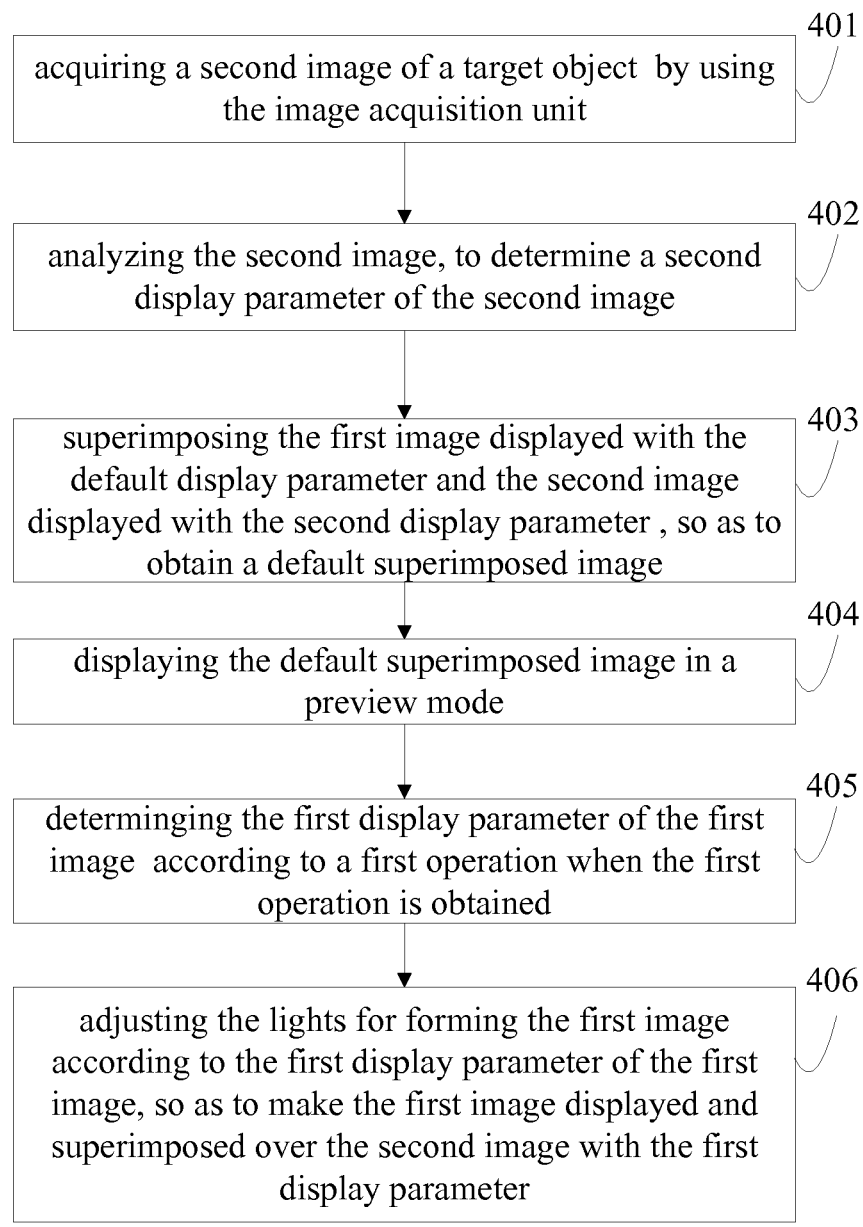
FIG. 4 shows a schematic flowchart illustrating an information processing method according to a fourth embodiment of the disclosure.

FIG. 4 shows a schematic flowchart illustrating an information processing method according to the fourth embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 4, said information processing method comprises the following steps.

In step 401, a second image of a target object is acquired. Step 401 may be implemented by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 402, the second image is analyzed, to determine a second display parameter of the second image.

In the embodiment of the disclosure, the second display parameter represents at least one of the following information of the second image: color information, and color temperature information. In particular, the image acquisition unit can acquire R/G/B information, i.e. color information, of the second image. The image acquisition unit can also acquire spectroscopic data of the first image. Here, the spectroscopic data represents the correspondences between the light intensities and wavelengths. Corresponding color temperature information can be computed based on the spectroscopic data. The greater the proportion of blue in the second image is, the higher the color temperature is. The greater the proportion of red is, the lower the color temperature is.

In step 403, the first image displayed with the default display parameter and the second image displayed with the second display parameter are superimposed, so as to obtain a default superimposed image.

In the embodiment of the disclosure, the default display parameter represents at least one of the following default information of the first image: color information, and color temperature information.

In the embodiment of the disclosure, the first image is displayed and superimposed over the second image.

In step 404, the default superimposed image is displayed in a preview mode.

In the embodiment of the disclosure, the default superimposed image can be previewed in advance, facilitating the user to view the display effect of the default superimposed image.

In step 405, the first display parameter of the first image is determined according to a first operation when the first operation is obtained.

Here, the first operation is used to adjust the default display parameter of the first image to the first display parameter.

In the embodiment of the disclosure, the first operation may be triggered by the user. After the user had viewed the display effect of the default superimposed image, the user may trigger the first operation, so as to adjust the default display parameter to the first display parameter.

In the embodiment of the disclosure, the first display parameter represents at least one of the following information of the first image: color information, and color temperature information.

In step 406, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter. As such, the superimposing of the display content and the second image can reach a predetermined display effect, which in turn makes the user well distinguishing the virtual interface and the reality interface, improving the user's experience.

Figure 5:
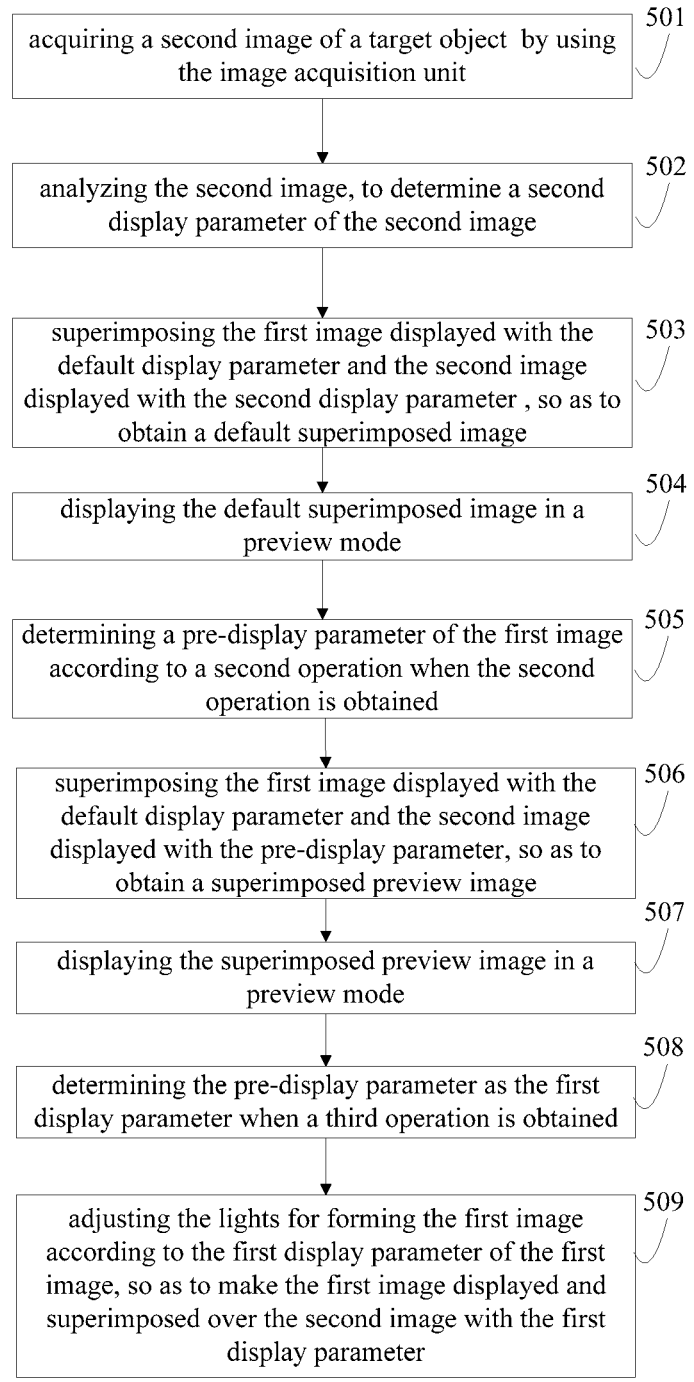
FIG. 5 shows a schematic flowchart illustrating an information processing method according to a fifth embodiment of the disclosure.

FIG. 5 shows a schematic flowchart illustrating an information processing method according to the fifth embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 5, said information processing method comprises the following steps.

In step 501, a second image of a target object is acquired. Step 501 may be implemented by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 502, the second image is analyzed, to determine a second display parameter of the second image.

In the embodiment of the disclosure, the second display parameter represents at least one of the following information of the second image: color information, and color temperature information. In particular, the image acquisition unit can acquire R/G/B information, i.e. color information, of the second image. The image acquisition unit can also acquire spectroscopic data of the first image. Here, the spectroscopic data represents the correspondences between the light intensities and wavelengths. Corresponding color temperature information can be computed based on the spectroscopic data. The greater the proportion of blue in the second image is, the higher the color temperature is. The greater the proportion of red is, the lower the color temperature is.

In step 503, the first image displayed with the default display parameter and the second image displayed with the second display parameter are superimposed, so as to obtain a default superimposed image.

In the embodiment of the disclosure, the default display parameter represents at least one of the following default information of the first image: color information, and color temperature information.

In the embodiment of the disclosure, the first image is displayed and superimposed over the second image.

In step 504, the default superimposed image is displayed in a preview mode.

In the embodiment of the disclosure, the default superimposed image can be previewed in advance, facilitating the user to view the display effect of the default superimposed image.

In step 505, a pre-display parameter of the first image is determined according to a second operation when the second operation is obtained.

Here, the second operation is used to adjust the default display parameter of the first image to the pre-display parameter.

In the embodiment of the disclosure, the second operation may be triggered by the user. After the user had viewed the display effect of the default superimposed image, the user can trigger the second operation, so as to adjust the default display parameter to the pre-display parameter.

In the embodiment of the disclosure, the pre-display parameter represents at least one of the following information of the first image: color information, and color temperature information.

In step 506, the first image displayed with the default display parameter and the second image displayed with the pre-display parameter is superimposed, so as to obtain a superimposed preview image.

In the embodiment of the disclosure, the superimposed preview image can be previewed again, facilitating the user to view the display effect of the superimposed preview image.

In step 507, the superimposed preview image is displayed in a preview mode.

In step 508, the pre-display parameter is determined as the first display parameter when a third operation is obtained.

In the embodiment of the disclosure, the third operation may be triggered by the user. After the user had viewed the display effect of the superimposed preview image, the user may trigger the third operation, so as to determine the pre-display parameter as the first display parameter.

In step 509, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter. As such, the superimposing of the display content and the second image can reach a predetermined display effect, which in turn makes the user well distinguishing the virtual interface and the reality interface, improving the user's experience.

Figure 6:
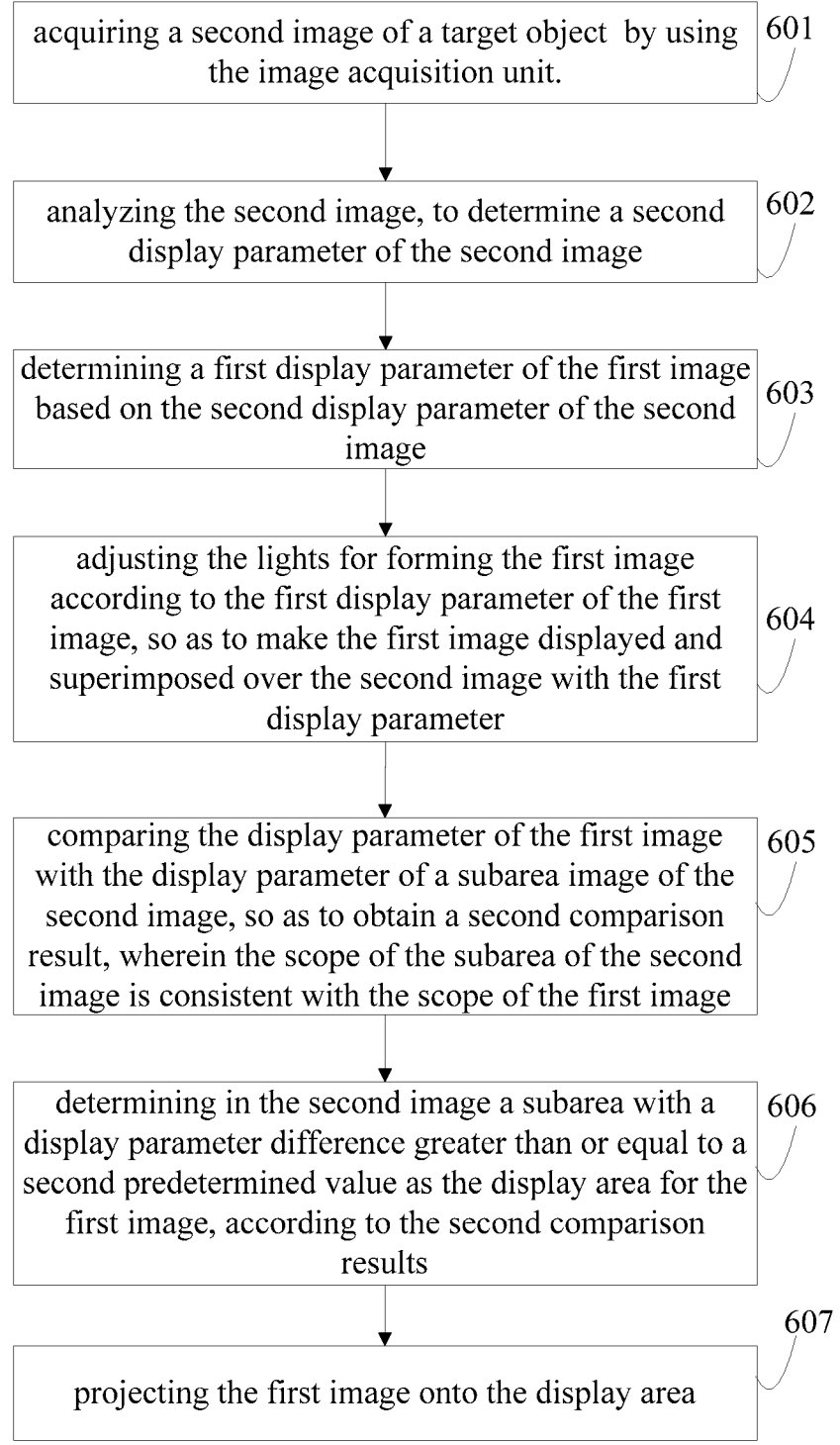
FIG. 6 shows a schematic flowchart illustrating an information processing method according to a sixth embodiment of the disclosure.

FIG. 6 shows a schematic flowchart illustrating an information processing method according to the sixth embodiment of the disclosure. The information processing method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises an image acquisition unit. As shown in FIG. 6, said information processing method comprises the following steps.

In step 601, a second image of a target object is acquired. Step 601 may be implemented by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be an image in a multimedia form such as a picture, a video, a document, etc. The lens module is used to change the direction of the light path for emitting the lights from the projection source, so as to project the lights for forming the first image onto the eye of the user of the electronic device, making the user view the contents to be displayed.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the contents to be displayed on the position of the visual focus through the lens module. As shown in FIG. 14, the visual focus is located on a straight line defined by the lens module and the user's eye, and the visual focus and the user's eye are located at opposite sides of the lens module.

In the embodiment of the disclosure, the electronic device further comprises an image acquisition unit, such as a camera. A second image of a target object can be acquired by using the image acquisition unit. Here, the target object is the actual scene, and the second image is the reality interface.

In step 602, the second image is analyzed, to determine a second display parameter of the second image.

In the embodiment of the disclosure, the second display parameter represents at least one of the following information of the second image: color information, and color temperature information. In particular, the image acquisition unit can acquire R/G/B information, i.e. color information, of the second image. The image acquisition unit can also acquire spectroscopic data of the first image. Here, the spectroscopic data represents the correspondences between the light intensities and wavelengths. Corresponding color temperature information can be computed based on the spectroscopic data. The greater the proportion of blue in the second image is, the higher the color temperature is. Greater the proportion of red is, lower the color temperature is.

In step 603, a first display parameter of the first image is determined based on the second display parameter of the second image, so as to make the difference between the first display parameter of the first image and the second display parameter of the second image greater than a threshold.

In the embodiment of the disclosure, the first display parameter represents at least one of the following information of the first image: color information, and color temperature information.

In the embodiment of the disclosure, in case that the first display parameter represents the color information of the first image, the default display parameter of the first image, which is displayed with the default display parameter, is compared with the second display parameter of the second image, so as to obtain a first comparison result. In case that the first comparison result indicates that the difference between the default display parameter and the second display parameter is less than or equal to a first predetermined value, the default display parameter of the first image is adjusted to the first display parameter, in order to make the difference between the first display parameter of the first image and the second display parameter of the second image greater than or equal to the first predetermined value. For example, the default display parameter of the first image represents that the proportion of blue in the first image is 80%, while the second display parameter of the second image represents that the proportion of blue in the second image is 70%. Then, the proportion of blue in the first image and the proportion of blue in the second image differ by 10%, which is less than the predetermined value of 50%. Thus, the default display parameter of the first image can be adjusted to the first display parameter, which has a value of 20%. As such, the proportion of blue in the first image and the proportion of blue in the second image differ by 60%, which is greater than the predetermined value of 50%. For another example, the default display parameter of the first image represents the gray value of the first image, while the second display parameter of the second image represents the gray value of the second image. When the difference between the gray value of the first image and the gray value of the first image is less than or equal to a first determined value, the default display parameter of the first image can be adjusted to the first display parameter, in order to make the difference between the gray value of the first image and the grey value of the second image greater than the first predetermined value. As such, the two images will have a desirable contrast.

In the embodiment of the disclosure, in case that the first display parameter represents color temperature information of the first image, the value of the color temperature of the second image is computed according to the second display parameter of the second image. The value of the color temperature of the first image is determined according to the value of the color temperature of the second image. The first display parameter of the first image is determined according to the value of the color temperature of the first image. In particular, the value of the color temperature of the second image is computed according to the spectroscopic data of the second image. When the user wants the two images to be viewed with a larger contrast, the color temperature of the first image can be adjusted to a value farther away from the value of the color temperature of the second image. When the user wants the two images to be viewed more softly, the color temperature of the first image can be adjusted to a value closer to the value of the color temperature of the second image. Then, lights of certain wavebands in the first image are filtered out according to the value of the color temperature of the first image, so as to obtain the first display parameter of the first image. Here, the lights of certain wavebands in the first image can be filtered out by using a filter.

In step 604, the lights for forming the first image is adjusted according to the first display parameter of the first image, so as to make the first image displayed and superimposed over the second image with the first display parameter.

In the embodiment of the disclosure, the projection unit adjusts the lights for forming the first image according to the first display parameter, so as to make the first image displayed and superimposed over the second image with the first display parameter.

In step 605, the display parameter of the first image is compared with the display parameter of a subarea image of the second image, so as to obtain a second comparison result, wherein the scope of the subarea of the second image is consistent with the scope of the first image.

In the embodiment of the disclosure, the scope of the first image is used as a sliding window, which is slid through the whole area of the second image. A sliding step can be set. For example, the step can be set as 10 pixels. Then the display parameter of the first image is compared with the display parameter of the subarea of the second image in each corresponding window.

In step 606, a subarea in the second image with a display parameter difference greater than or equal to a second predetermined value is determined as the display area for the first image, according to the second comparison results.

In the embodiment of the disclosure, the display parameter difference greater than or equal to the second predetermined value represents a larger contrast between the image in the subarea of the second image and the first image. For example, if there is a large difference in the grey values or the color information, the first image can be projected onto this subarea. As such, the user can distinguish the first image from the second image quickly.

In step 607, the first image is projected onto the display area.

In the embodiment of the disclosure, the superimposing of the display content and the second image can reach a predetermined display effect, which in turn makes the user well distinguishing the virtual interface and the reality interface, improving the user's experience.

Figure 7:
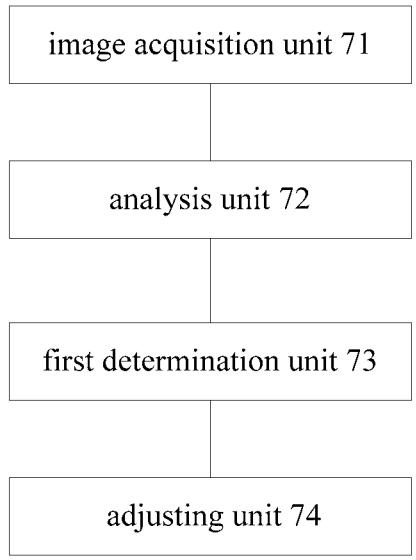
FIG. 7 shows a schematic block diagram of a portable electronic device according to a first embodiment of the disclosure.

FIG. 7 shows a schematic block diagram of a portable electronic device according to the first embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 71 configured for acquiring a second image of a target object;

an analysis unit 72 configured for analyzing the second image to determine a second display parameter of the second image; and a first determination unit 73 configured for determining a first display parameter of the first image based on the second display parameter of the second image, so as to make the difference between the first display parameter of the first image and the second display parameter of the second image greater than a threshold.

Optionally, the electronic device may further comprise an adjusting unit 74. The adjusting unit 74 is configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Those skilled in the art should appreciate that, functions realized by respective units of the portable electronic device according to the embodiment of the disclosure can be understood with reference to respective descriptions of the information processing methods described above. Functions of the respective units of the portable electronic device according to the embodiment of the disclosure can be implemented by programs executed on a processor, or implemented in specific logic circuits.

Figure 8:
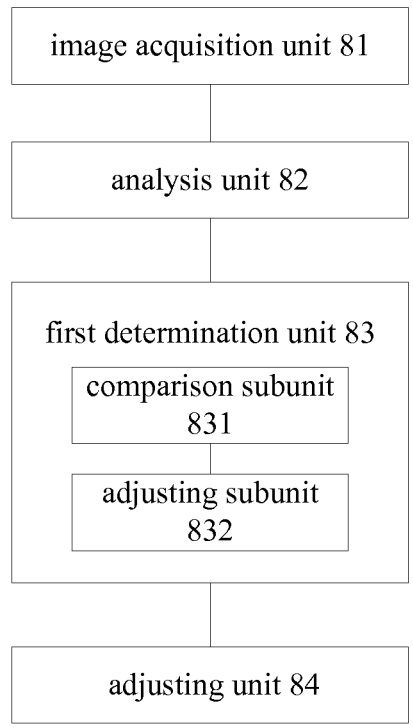
FIG. 8 shows a schematic block diagram of a portable electronic device according to a second embodiment of the disclosure.

FIG. 8 shows a schematic block diagram of a portable electronic device according to the second embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 81 configured for acquiring a second image of a target object;

an analysis unit 82 configured for analyzing the second image to determine a second display parameter of the second image;

a first determination unit 83 configured for determining a first display parameter of the first image based on the second display parameter of the second image, so as to make the difference between the first display parameter of the first image and the second display parameter of the second image greater than a threshold; and an adjusting unit 84 configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Preferably, in case that the first display parameter and the second display parameter represent color information of the first image and the second image respectively, the first determination unit 83 comprises:

a comparison subunit 831 configured for comparing a default display parameter of the first image, which is displayed with the default display parameter, with the second display parameter of the second image, so as to obtain a first comparison result; and an adjusting subunit 832 configured for, in case that the first comparison result indicates that the difference between the default display parameter and the second display parameter is less than or equal to a first predetermined value, adjusting the default display parameter of the first image to the first display parameter, in order to make the difference between the first display parameter of the first image and the second display parameter of the second image greater than or equal to the first predetermined value.

Those skilled in the art should appreciate that, functions realized by respective units of the portable electronic device according to the embodiment of the disclosure can be understood with reference to respective descriptions of the information processing methods described above. Functions of the respective units of the portable electronic device according to the embodiment of the disclosure can be implemented by programs executed on a processor, or implemented in specific logic circuits.

Figure 9:
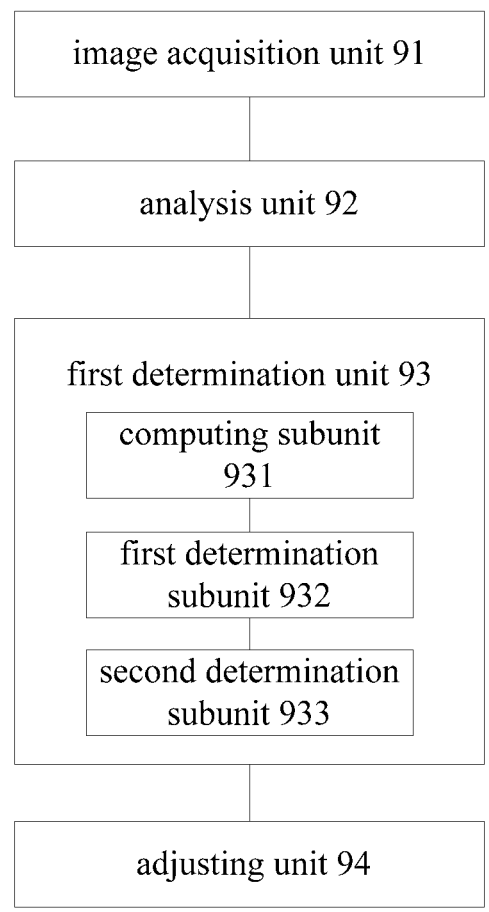
FIG. 9 shows a schematic block diagram of a portable electronic device according to a third embodiment of the disclosure.

FIG. 9 shows a schematic block diagram of a portable electronic device according to the third embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 91 configured for acquiring a second image of a target object;

an analysis unit 92 configured for analyzing the second image to determine a second display parameter of the second image;

a first determination unit 93 configured for determining a first display parameter of the first image based on the second display parameter of the second image, so as to make the difference between the first display parameter of the first image and the second display parameter of the second image greater than a threshold; and an adjusting unit 94 configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Preferably, in case that the first display parameter and the second display parameter represent color temperature information of the first image and the second image respectively, the first determination unit 93 comprises:

a computing subunit 931 configured for computing the value of the color temperature of the second image according to the second display parameter of the second image;

a first determination subunit 932 configured for determining the value of the color temperature of the first image according to the value of the color temperature of the second image; and a second determination subunit 933 configured for determining the first display parameter of the first image according to the value of the color temperature of the first image.

Those skilled in the art should appreciated that, functions realized by respective units of the portable electronic device according to the embodiment of the disclosure can be understood with reference to respective descriptions of the information processing methods described above. Functions of the respective units of the portable electronic device according to the embodiment of the disclosure can be implemented by programs executed on a processor, or implemented in specific logic circuits.

Figure 10:
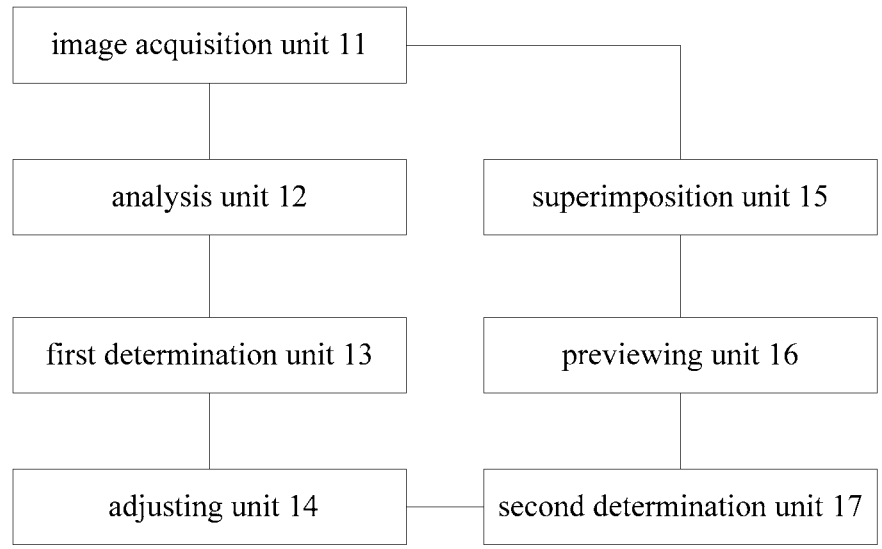
FIG. 10 shows a schematic block diagram of a portable electronic device according to a fourth embodiment of the disclosure.

FIG. 10 shows a schematic block diagram of a portable electronic device according to the fourth embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 11 configured for acquiring a second image of a target object;

an analysis unit 12 configured for analyzing the second image to determine a second display parameter of the second image;

a first determination unit 13 configured for determining a first display parameter of the first image based on the second display parameter of the second image, so as to make the difference between the first display parameter of the first image and the second display parameter of the second image greater than a threshold; and an adjusting unit 14 is configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Preferably, the electronic device further comprises:

a superimposition unit 15, configured for superimposing the first image displayed with the default display parameter and the second image displayed with the second display parameter, so as to obtain a default superimposed image;

a previewing unit 16, configured for displaying the default superimposed image in a preview mode;

a second determination unit 17, configured for determining the first display parameter of the first image according to a first operation when the first operation is obtained, wherein the first operation is used to adjust the default display parameter of the first image to the first display parameter.

Those skilled in the art should appreciate that, functions realized by respective units of the portable electronic device according to the embodiment of the disclosure can be understood with reference to respective descriptions of the information processing methods described above. Functions of the respective units of the portable electronic device according to the embodiment of the disclosure can be implemented by programs executed on a processor, or implemented in specific logic circuits.

Figure 11:
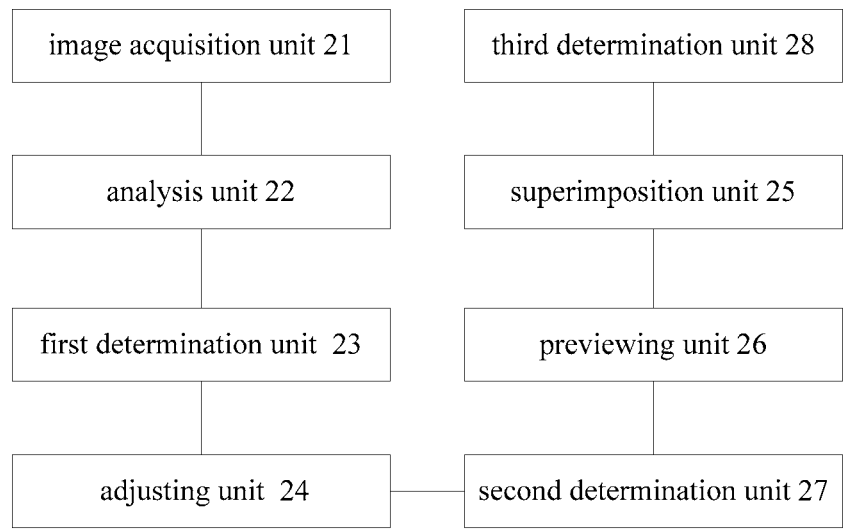
FIG. 11 shows a schematic block diagram of a portable electronic device according to a fifth embodiment of the disclosure.

FIG. 11 shows a schematic block diagram of a portable electronic device according to the fifth embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 21 configured for acquiring a second image of a target object;

an analysis unit 22 configured for analyzing the second image to determine a second display parameter of the second image;

a first determination unit 23 configured for determining a first display parameter of the first image based on the second display parameter of the second image, so as to make the difference between the first display parameter of the first image and the second display parameter of the second image greater than a threshold; and an adjusting unit 24 is configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Preferably, the electronic device further comprises:

a superimposition unit 25, configured for superimposing the first image displayed with the default display parameter and the second image displayed with the second display parameter, so as to obtain a default superimposed image;

a previewing unit 26, configured for displaying the default superimposed image in a preview mode;

a second determination unit 27, configured for determining the first display parameter of the first image according to a first operation when the first operation is obtained, wherein the first operation is used to adjust the default display parameter of the first image to the first display parameter.

Preferably, the electronic device further comprises:

a third determination unit 28, configured for determining a pre-display parameter of the first image according to a second operation when the second operation is obtained, wherein the superimposition unit 25 is further configured for superimposing the first image displayed with the default display parameter and the second image displayed with the pre-display parameter, so as to obtain a superimposed preview image;

wherein the previewing unit 26 is further configured for displaying the superimposed preview image in a preview mode;

wherein the second determination unit 27 is further configured for determining the pre-display parameter as the first display parameter when a third operation is obtained;

wherein the adjusting unit 24 is further configured for adjusting the lights for forming the first image according to the first display parameter of the first image, so as to make the first image displayed and superimposed over the second image with the first display parameter.

Those skilled in the art should appreciated that, functions realized by respective units of the portable electronic device according to the embodiment of the disclosure can be understood with reference to respective descriptions of the information processing methods described above. Functions of the respective units of the portable electronic device according to the embodiment of the disclosure can be implemented by programs executed on a processor, or implemented in specific logic circuits.

Figure 12:
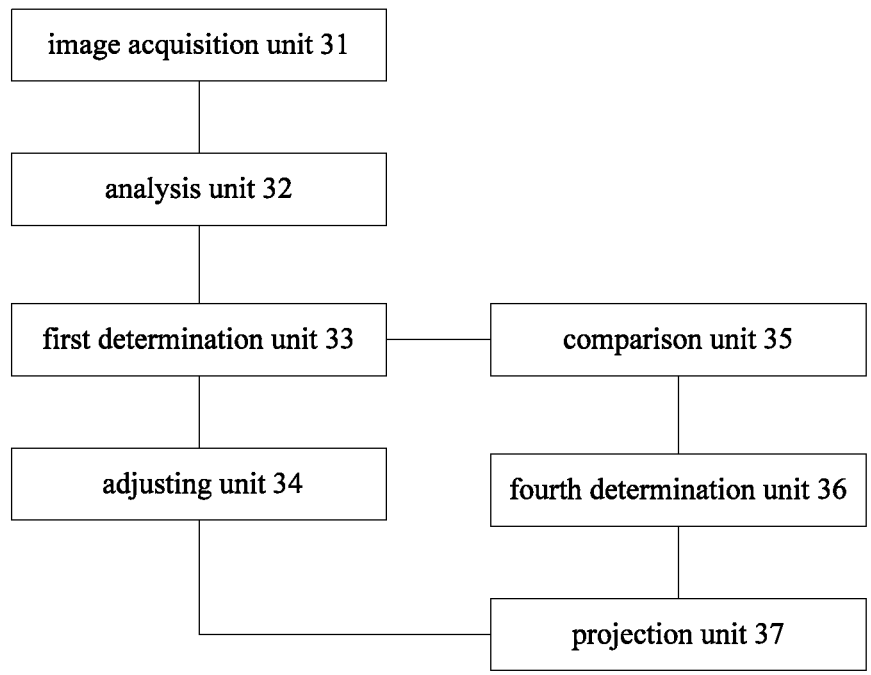
FIG. 12 shows a schematic block diagram of a portable electronic device according to a sixth embodiment of the disclosure.

FIG. 12 shows a schematic block diagram of a portable electronic device according to the sixth embodiment of the disclosure. The electronic device in the present example comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module.

The electronic device further comprises:

an image acquisition unit 31 configured for acquiring a second image of a target object;

an analysis unit 32 configured for analyzing the second image to determine a second display parameter of the second image;

a first determination unit 33 configured for determining a first display parameter of the first image based on the second display parameter of the second image, so as to make the difference between the first display parameter of the first image and the second display parameter of the second image greater than a threshold; and an adjusting unit 34 is configured for adjusting the lights for forming the first image according to the first display parameter of the first image, so as to make the first image displayed and superimposed over the second image with the first display parameter.

Here, the first display parameter and the second display parameter represent at least one of the following information of the first image and the second image respectively: color information, and color temperature information.

Preferably, the electronic device further comprises:

a comparison unit 35, configured for comparing the display parameter of the first image with the display parameter of a subarea image of the second image, so as to obtain a second comparison result, wherein the scope of the subarea of the second image is consistent with the scope of the first image;

a fourth determination unit 36, configured for determining, in the second image, a subarea with a display parameter difference greater than or equal to a second predetermined value as the display area for the first image, according to the second comparison results; and a projection unit 37, configured for projecting the first image onto the display area.

FIGS. 15-25 show schematic diagrams illustrating control methods and portable electronic devices according to the seventh to eleventh embodiments of the disclosure. It should be appreciated that, the methods and devices shown in these figures may be either used in connection with the methods and devices described above with reference to the FIGS. 1 to 14, or used independent of the methods and devices described above with reference to the FIGS. 1 to 14. The following description will be given for a case wherein the methods and devices shown in these figures are independent of the methods and devices described above with reference to the FIGS. 1 to 14, but it does not exclude that they may be used in connection with the methods and devices described above with reference to the FIGS. 1 to 14.

Figure 15:
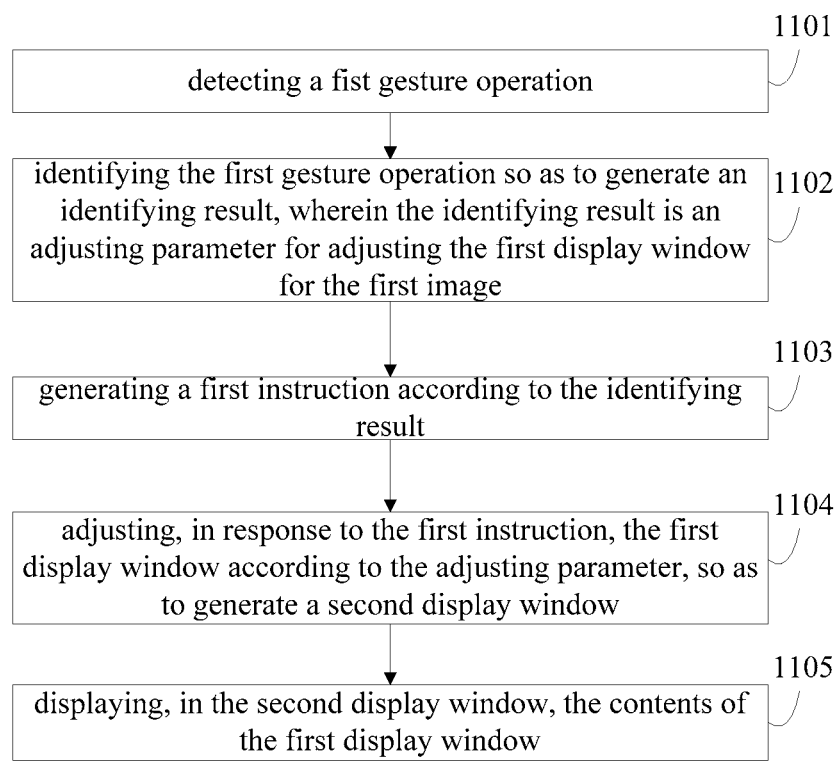
FIG. 15 shows a schematic flowchart illustrating a control method according to a seventh embodiment of the disclosure.

FIG. 15 shows a schematic flowchart illustrating a control method according to the seventh embodiment of the disclosure. The control method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. As shown in FIG. 15, said control method comprises the following steps.

In step 1101, a first gesture operation is detected.

Here, the first gesture operation is an operation moving along a first direction, and the first gesture operation is used to adjust a first display window for the first image.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be contents in multimedia forms such as contents in a picture, contents in a video, contents in a document, etc. The lens module is used to change the direction of the light path for emitting the lights from the projection source, so as to project the lights for forming the first image onto the eye of the user of the electronic device, making the user view the first image.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the first image on the position of the visual focus through the lens module. As shown in FIG. 14, the visual focus is located on a straight line defined by the lens module and the user's eye, and the visual focus and the user's eye are located at opposite sides of the lens module.

The embodiment of the disclosure intends to adjust the size of the first display window for the first image. Here, the first display window may represent a display window for the whole full screen area of the first image, or may represent some small window within the first image.

Figure 25:
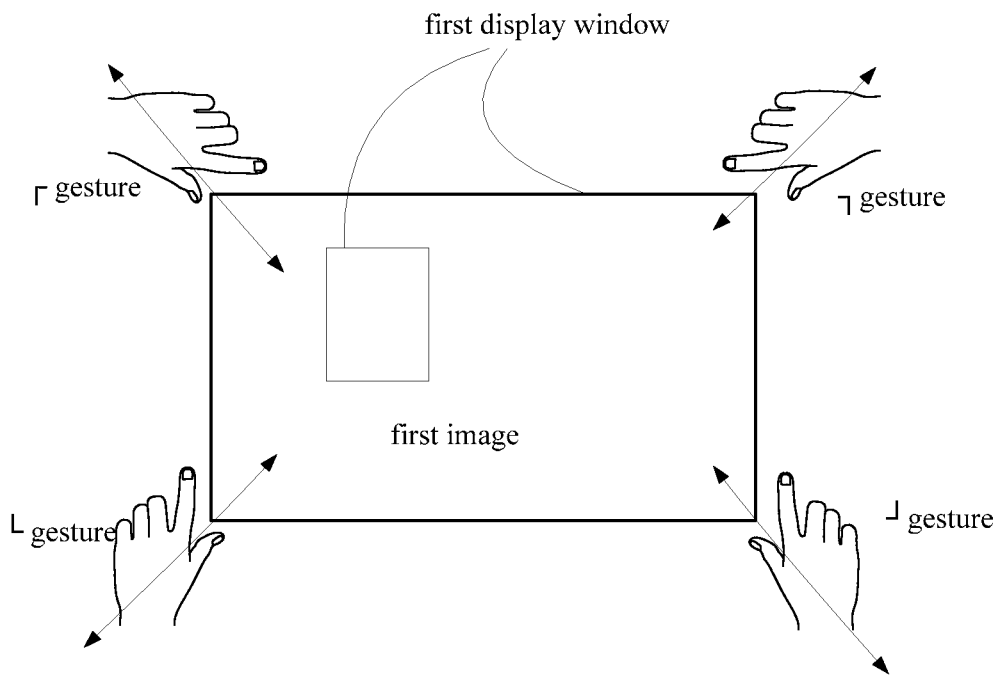
FIG. 25 shows a schematic diagram of a first image according to an embodiment of the disclosure.

With reference to FIG. 25, which shows a schematic diagram of the first image, assume that the first display window the user wants to adjust is the display window for the whole full screen area of the first image. At this time, the user may trigger the portable electronic device to adjust the first display window for the first image via the first gesture operation. Specifically, the camera in the electronic device acquires gesture image data corresponding to the gesture operation. Then, the gesture operation is identified. Specifically, the gesture image data is analyzed, so as to obtain characteristic data of the gesture image data. Here, the characteristic data represent the contour information, the edge information and the like of the gesture operation. Then, it is judged whether said characteristic data matches with characteristic data of a predetermined gesture, so as to obtain a judgment result. Here, the predetermined gesture may be set by the user in advance. For example, with reference to FIG. 25, the predetermined gesture may be a gesture shaped like ⌈, ⌉, ⌊, or ⌋. Finally, in case that the judgment result indicates that said characteristic data matches with characteristic data of the predetermined gesture, it is determined that the first gesture operation is detected.

In the embodiment of the disclosure, it is expected to adjust the size of the first display window via the first gesture operation. Accordingly, the first gesture operation is an operation moving along a first direction to determine how to adjust the size of the first display window. With reference to FIG. 25, when the gesture approaches the low right, the first display window will make a timely response. When the gesture moves at an angle of 45 degrees, the low right of the first display window will be pulled inward or outward, making the entire first display window zoom out or zoom in.

In step 1102, the first gesture operation is identified so as to generate an identifying result, wherein the identifying result is an adjusting parameter for adjusting the first display window for the first image.

In the embodiment of the disclosure, said identifying the first gesture operation comprises: identifying whether the change of the first gesture operation is made within a first plane; and/or identifying whether the change of the first gesture operation is made on an axis perpendicular to the first plane.

Here, the first gesture operation is an operation moving along the first direction. Identifying the first gesture operation means identifying the moving direction of the first gesture operation, so as to determine how to adjust the size of the current first display window.

For an example, it is identified whether the change of the first gesture operation is made within a first plane, wherein the first plane may be an interface in parallel with the first image. As such, when the first gesture operation moves within the first plane, the adjusting parameter for adjusting the size of the first display window can be determined. For another example, it is identified whether the change of the first gesture operation is made on an axis perpendicular to the first plane. As such, when the first gesture operation moves within the first plane, the adjusting parameter for zooming in or zooming out the first display window can be determined. Here, when the first display window is zoomed in or zoomed out, the size of the first display window can also be adjusted.

Based on this, the adjusting parameter in the embodiment of the disclosure may be an adjusting parameter for adjusting the size of the first display window, or may be an adjusting parameter for adjusting the distance between the first display window and the lens module.

In step 1103, a first instruction is generated according to the identifying result.

In the embodiment of the disclosure, the first instruction contains information such as the adjusting parameter and the like.

In step 1104, in response to the first instruction, the first display window is adjusted according to the adjusting parameter, so as to generate a second display window.

Here, the second display window and the first window display the same contents.

In the embodiment of the disclosure, if the adjusting parameter is the one for adjusting the size of the first display window, said adjusting the first display window according to the adjusting parameter specifically comprises: determining, according to the adjusting parameter, a first display parameter of the first display window, wherein the first display parameter represents the size of a display area of the first display window; varying the first display window based on the first display parameter, so as to generate the second display window, wherein the second display window and the first window display the same contents; controlling the projection source of the projection unit to emit lights for forming the second display window, so as to make the user view the second display window at the location of the current visual focus. Here, the location of the visual focus is kept unchanged during the adjustment of the size of the first display window, and thus the user can view changes of the size of the first display window at a same visual focus.

In the embodiment of the disclosure, if the adjusting parameter is the one for adjusting the distance between the first display window and the lens module, said adjusting the first display window according to the adjusting parameter specifically comprises: adjusting, according to the adjusting parameter, the location of a visual focus at which the first display window is located, so as to move the first display window located at a first visual focus to the second display window located at a second visual focus; wherein the first visual focus and the second visual focus are both located on a straight line defined by the lens module and the user's eye. Specifically, the location of the visual focus at which the first display window is located can be adjusted by controlling the distance between the projection source of the projection unit and the lens of the lens module and/or controlling the focal length of the lens of the lens module. Here, when the distance between the first display window and the lens module is adjusted, the visual focus changes. As such, the user can view different display windows displaying the same contents at two different visual focuses.

In step 1105, the contents in the first display window are displayed in the second display window.

In the embodiments of the disclosure, the identifying result representing an adjusting parameter for adjusting the first display window for the first image is identified by identifying the first gesture operation. Then, the second display window is generated by adjusting, according to the adjusting parameter, the size of the first display window or the distance between the first display window and the lens module. Then, the contents in the first display window are displayed in the second display window. As such, the user can freely adjust the size of the virtual interface via a gesture, according to different scenarios or user preferences. Such an adjusting method is simple and the user's experience is improved.

Figure 16:
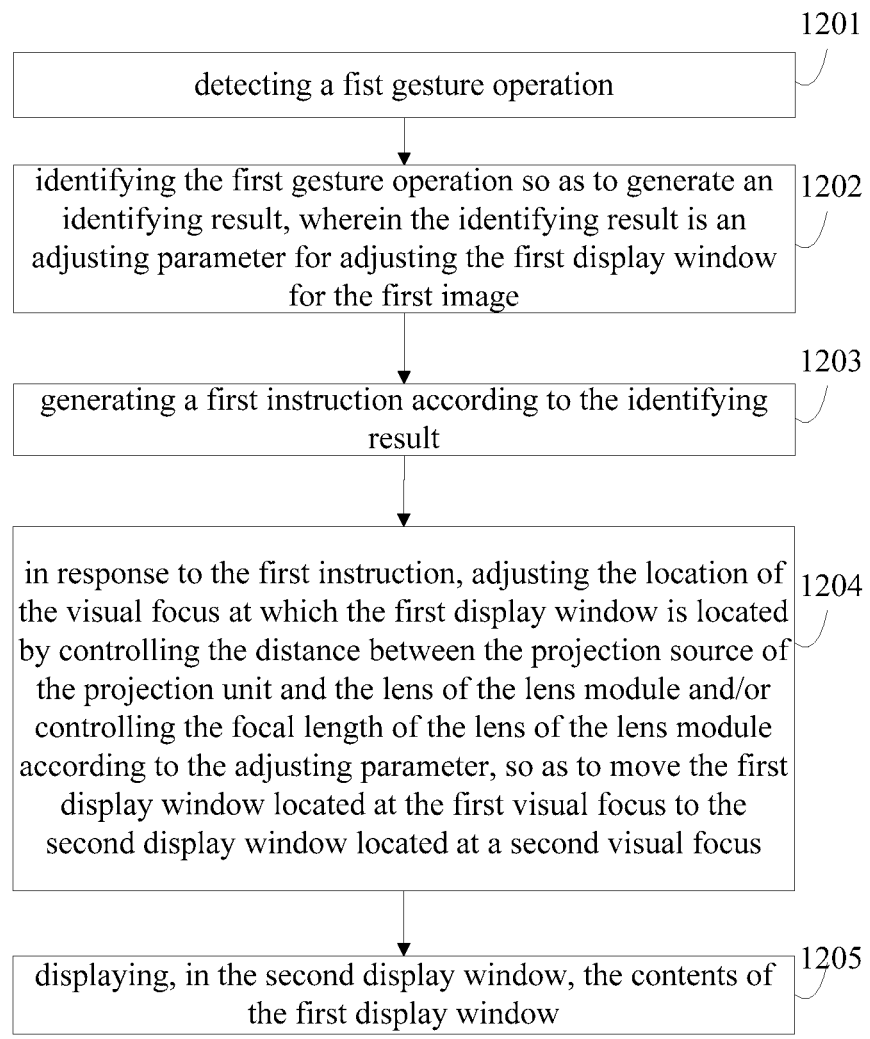
FIG. 16 shows a schematic flowchart illustrating a control method according to an eighth embodiment of the disclosure.

FIG. 16 shows a schematic flowchart illustrating a control method according to the eighth embodiment of the disclosure. The control method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. As shown in FIG. 16, said control method comprises the following steps.

In step 1201, a first gesture operation is detected.

Here, the first gesture operation is an operation moving along a first direction, and the first gesture operation is used to adjust a first display window for the first image.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be contents in multimedia forms such as contents in a picture, contents in a video, contents in a document, etc. The lens module is used to change the direction of the light path for emitting the lights from the projection source, so as to project the lights for forming the first image onto the eye of the user of the electronic device, making the user view the first image.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the first image on the position of the visual focus through the lens module. As shown in FIG. 14, the visual focus is located on a straight line defined by the lens module and the user's eye, and the visual focus and the user's eye are located at opposite sides of the lens module.

The embodiment of the disclosure intends to adjust the size of the first display window for the first image. Here, the first display window may represent a display window for the whole full screen area of the first image, or may represent some small window within the first image.

With reference to FIG. 25, which shows a schematic diagram of the first image, assume that the first display window the user wants to adjust is the display window for the whole full screen area of the first image. At this time, the user may trigger the portable electronic device to adjust the first display window for the first image via the first gesture operation. Specifically, the camera in the electronic device acquires gesture image data corresponding to the gesture operation. Then, the gesture operation is identified. Specifically, the gesture image data is analyzed, so as to obtain characteristic data of the gesture image data. Here, the characteristic data represent the contour information, the edge information and the like of the gesture operation. Then, it is judged whether said characteristic data matches with characteristic data of a predetermined gesture, so as to obtain a judgment result. Here, the predetermined gesture may be set by the user in advance. For example, with reference to FIG. 25, the predetermined gesture may be a gesture shaped like ⌈, ⌉, ⌊, or ⌋. Finally, in case that the judgment result indicates that said characteristic data matches with characteristic data of the predetermined gesture, it is determined that the first gesture operation is detected.

In the embodiment of the disclosure, it is expected to adjust the size of the first display window via the first gesture operation. Accordingly, the first gesture operation is an operation moving along a first direction to determine how to adjust the size of the first display window. With reference to FIG. 25, when the gesture approaches the low right, the first display window will make a timely response. When the gesture moves at an angle of 45 degrees, the low right of the first display window will be pulled inward or outward, making the entire first display window zoom out or zoom in.

In step 1202, the first gesture operation is identified so as to generate an identifying result, wherein the identifying result is an adjusting parameter for adjusting the first display window for the first image.

In the embodiment of the disclosure, said identifying the first gesture operation comprises: identifying whether the change of the first gesture operation is made within a first plane; and/or identifying whether the change of the first gesture operation is made on an axis perpendicular to the first plane.

Here, the first gesture operation is an operation moving along the first direction. Identifying the first gesture operation means identifying the moving direction of the first gesture operation, so as to determine how to adjust the size of the current first display window.

For an example, it is identified whether the change of the first gesture operation is made within a first plane, wherein the first plane may be an interface in parallel with the first image. As such, when the first gesture operation moves within the first plane, the adjusting parameter for adjusting the size of the first display window can be determined. For another example, it is identified whether the change of the first gesture operation is made on an axis perpendicular to the first plane. As such, when the first gesture operation moves within the first plane, the adjusting parameter for zooming in or zooming out the first display window can be determined. Here, when the first display window is zoomed in or zoomed out, the size of the first display window can also be adjusted.

The adjusting parameter in the embodiment of the disclosure is an adjusting parameter for adjusting the distance between the first display window and the lens module.

In step 1203, a first instruction is generated according to the identifying result.

In the embodiment of the disclosure, the first instruction contains information such as the adjusting parameter and the like.

In step 1204, in response to the first instruction, the location of the visual focus at which the first display window is located is adjusted by controlling the distance between the projection source of the projection unit and the lens of the lens module and/or controlling the focal length of the lens of the lens module according to the adjusting parameter, so as to move the first display window located at a first visual focus to the second display window located at a second visual focus.

Here, the first visual focus and the second visual focus are both located on a straight line defined by the lens module and the user's eye.

Here, the second display window and the first window display the same contents.

In the embodiment of the disclosure, the location of a visual focus at which the first display window is located is adjusted according to the adjusting parameter, so as to move the first display window located at a first visual focus to the second display window located at a second visual focus, wherein the first visual focus and the second visual focus are both located on a straight line defined by the lens module and the user's eye. Specifically, the location of the visual focus at which the first display window is located can be adjusted by controlling the distance between the projection source of the projection unit and the lens of the lens module and/or controlling the focal length of the lens of the lens module. Here, when the distance between the first display window and the lens module is adjusted, the visual focus changes. As such, the user can view different display windows displaying the same contents at two different visual focuses.

In step 1205, the contents in the first display window are displayed in the second display window.

In the embodiments of the disclosure, the identifying result representing an adjusting parameter for adjusting the first display window for the first image is identified by identifying the first gesture operation. Then, the second display window is generated by adjusting, according to the adjusting parameter, the size of the first display window or the distance between the first display window and the lens module. Then, the contents in the first display window are displayed in the second display window. As such, the user can freely adjust the size of the virtual interface via a gesture, according to different scenarios or user preferences. Such an adjusting method is simple and the user's experience is improved.

Figure 17:
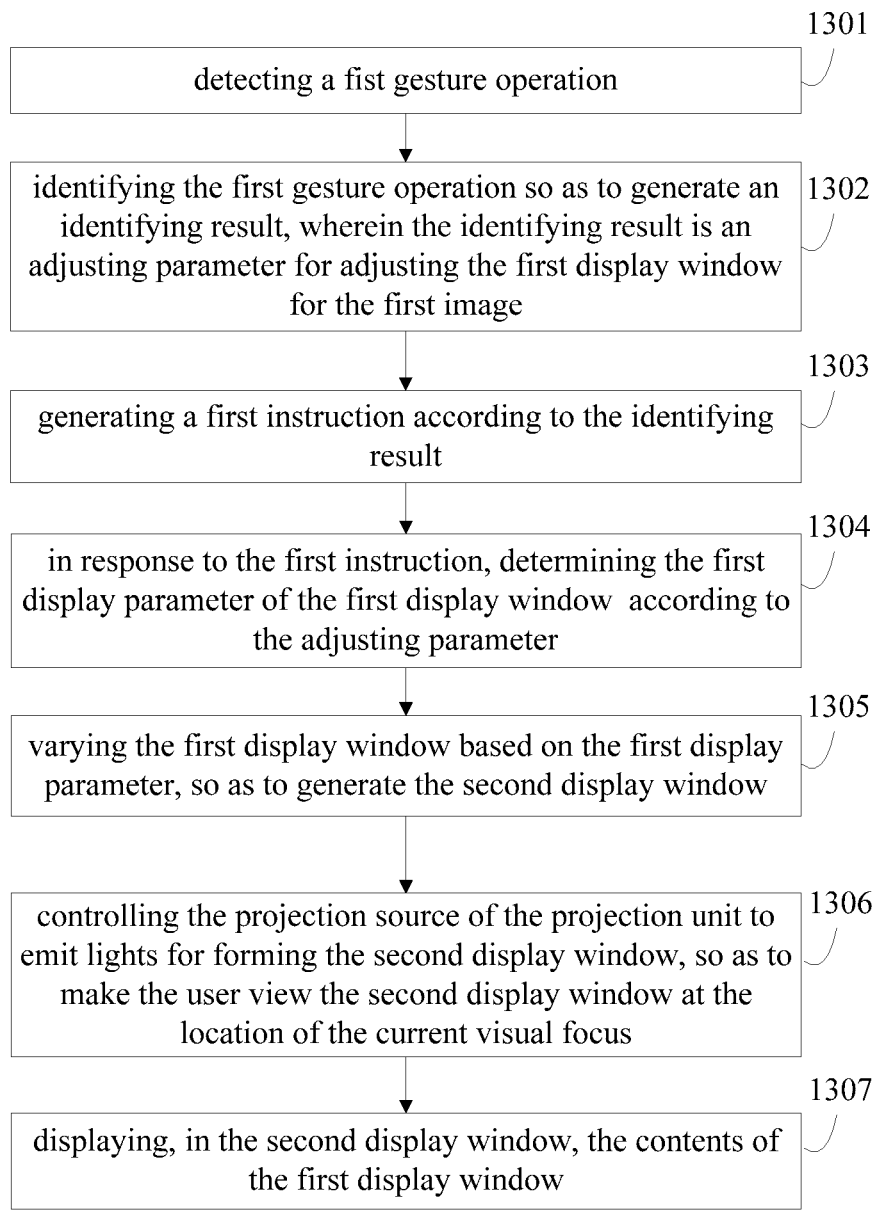
FIG. 17 shows a schematic flowchart illustrating a control method according to a ninth embodiment of the disclosure.

FIG. 17 shows a schematic flowchart illustrating a control method according to the ninth embodiment of the disclosure. The control method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. As shown in FIG. 17, said control method comprises the following steps.

In step 1301, a first gesture operation is detected.

Here, the first gesture operation is an operation moving along a first direction, and the first gesture operation is used to adjust a first display window for the first image.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be contents in multimedia forms such as contents in a picture, contents in a video, contents in a document, etc. The lens module is used to change the direction of the light path for emitting the lights from the projection source, so as to project the lights for forming the first image onto the eye of the user of the electronic device, making the user view the first image.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the first image on the position of the visual focus through the lens module. As shown in FIG. 14, the visual focus is located on a straight line defined by the lens module and the user's eye, and the visual focus and the user's eye are located at opposite sides of the lens module.

The embodiment of the disclosure intends to adjust the size of the first display window for the first image. Here, the first display window may represent a display window for the whole full screen area of the first image, or may represent some small window within the first image.

With reference to FIG. 25, which shows a schematic diagram of the first image, assume that the first display window the user wants to adjust is the display window for the whole full screen area of the first image. At this time, the user may trigger the portable electronic device to adjust the first display window for the first image via the first gesture operation. Specifically, the camera in the electronic device acquires gesture image data corresponding to the gesture operation. Then, the gesture operation is identified. Specifically, the gesture image data is analyzed, so as to obtain characteristic data of the gesture image data. Here, the characteristic data represent the contour information, the edge information and the like of the gesture operation. Then, it is judged whether said characteristic data matches with characteristic data of a predetermined gesture, so as to obtain a judgment result. Here, the predetermined gesture may be set by the user in advance. For example, with reference to FIG. 25, the predetermined gesture may be a gesture shaped like ⌈, ⌉, ⌊, or ⌋. Finally, in case that the judgment result indicates that said characteristic data matches with characteristic data of the predetermined gesture, it is determined that the first gesture operation is detected.

In the embodiment of the disclosure, it is expected to adjust the size of the first display window via the first gesture operation. Accordingly, the first gesture operation is an operation moving along a first direction to determine how to adjust the size of the first display window. With reference to FIG. 25, when the gesture approaches the low right, the first display window will make a timely response. When the gesture moves at an angle of 45 degrees, the low right of the first display window will be pulled inward or outward, making the entire first display window zoom out or zoom in.

In step 1302, the first gesture operation is identified so as to generate an identifying result, wherein the identifying result is an adjusting parameter for adjusting the first display window for the first image.

In the embodiment of the disclosure, said identifying the first gesture operation comprises: identifying whether the change of the first gesture operation is made within a first plane; and/or identifying whether the change of the first gesture operation is made on an axis perpendicular to the first plane.

Here, the first gesture operation is an operation moving along the first direction. Identifying the first gesture operation means identifying the moving direction of the first gesture operation, so as to determine how to adjust the size of the current first display window.

For an example, it is identified whether the change of the first gesture operation is made within a first plane, wherein the first plane may be an interface in parallel with the first image. As such, when the first gesture operation moves within the first plane, the adjusting parameter for adjusting the size of the first display window can be determined. For another example, it is identified whether the change of the first gesture operation is made on an axis perpendicular to the first plane. As such, when the first gesture operation moves within the first plane, the adjusting parameter for zooming in or zooming out the first display window can be determined. Here, when the first display window is zoomed in or zoomed out, the size of the first display window can also be adjusted.

The adjusting parameter in the embodiment of the disclosure is an adjusting parameter for adjusting the size of the first display window.

In step 1303, a first instruction is generated according to the identifying result.

In the embodiment of the disclosure, the first instruction contains information such as the adjusting parameter and the like.

In step 1304, in response to the first instruction, the first display parameter of the first display window is determined according to the adjusting parameter.

Here, the first display parameter represents the size of the display area of the first display window.

In step 1305, the first display window is varied based on the first display parameter, so as to generate the second display window.

Here, the second display window and the first window display the same contents.

In step 1306, the projection source of the projection unit is controlled to emit lights for forming the second display window, so as to make the user view the second display window at the location of the current visual focus.

In the embodiment of the disclosure, if the adjusting parameter is the one for adjusting the size of the first display window, said adjusting the first display window according to the adjusting parameter specifically comprises: determining, according to the adjusting parameter, a first display parameter of the first display window, wherein the first display parameter represents the size of a display area of the first display window; varying the first display window based on the first display parameter, so as to generate the second display window, wherein the second display window and the first window display the same contents; controlling the projection source of the projection unit to emit lights for forming the second display window, so as to make the user view the second display window at the location of the current visual focus. Here, the location of the visual focus is kept unchanged during the adjustment of the size of the first display window, and thus the user can view changes of the size of the first display window at a same visual focus.

In the embodiment of the disclosure, if the adjusting parameter is the one for adjusting the distance between the first display window and the lens module, said adjusting the first display window according to the adjusting parameter specifically comprises: adjusting, according to the adjusting parameter, the location of a visual focus at which the first display window is located, so as to move the first display window located at a first visual focus to the second display window located at a second visual focus; wherein the first visual focus and the second visual focus are both located on a straight line defined by the lens module and the user's eye. Specifically, the location of the visual focus at which the first display window is located can be adjusted by controlling the distance between the projection source of the projection unit and the lens of the lens module and/or controlling the focal length of the lens of the lens module. Here, when the distance between the first display window and the lens module is adjusted, the visual focus changes. As such, the user can view different display windows displaying the same contents at two different visual focuses.

In step 1307, the contents in the first display window are displayed in the second display window.

In the embodiments of the disclosure, the identifying result representing an adjusting parameter for adjusting the first display window for the first image is identified by identifying the first gesture operation. Then, the second display window is generated by adjusting, according to the adjusting parameter, the size of the first display window or the distance between the first display window and the lens module. Then, the contents in the first display window are displayed in the second display window. As such, the user can freely adjust the size of the virtual interface via a gesture, according to different scenarios or user preferences. Such an adjusting method is simple and the user's experience is improved.

Figure 18:
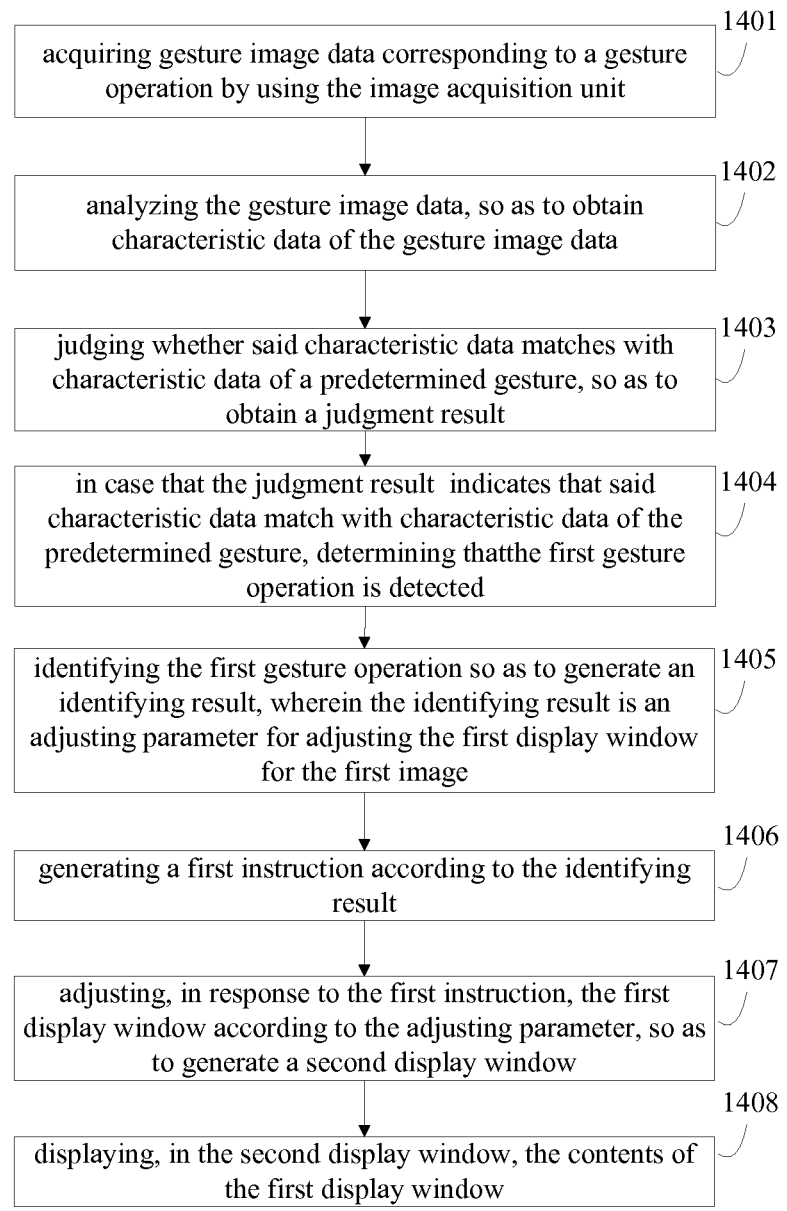
FIG. 18 shows a schematic flowchart illustrating a control method according to a tenth embodiment of the disclosure.

FIG. 18 shows a schematic flowchart illustrating a control method according to the tenth embodiment of the disclosure. The control method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. The electronic device further comprises a image acquisition unit. As shown in FIG. 18, said control method comprises the following steps.

In step 1401, the gesture image data corresponding to a gesture operation is acquired by using the image acquisition unit.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be contents in multimedia forms such as contents in a picture, contents in a video, contents in a document, etc. The lens module is used to change the direction of the light path for emitting the lights from the projection source, so as to project the lights for forming the first image onto the eye of the user of the electronic device, making the user view the first image.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the first image on the position of the visual focus through the lens module. As shown in FIG. 14, the visual focus is located on a straight line defined by the lens module and the user's eye, and the visual focus and the user's eye are located at opposite sides of the lens module.

The embodiment of the disclosure intends to adjust the size of the first display window for the first image. Here, the first display window may represent a display window for the whole full screen area of the first image, or may represent some small window within the first image.

With reference to FIG. 25, which shows a schematic diagram of the first image, assume that the first display window the user wants to adjust is the display window for the whole full screen area of the first image. At this time, the user may trigger the portable electronic device to adjust the first display window for the first image via the first gesture operation. Specifically, the camera in the electronic device acquires gesture image data corresponding to the gesture operation.

In step 1402, the gesture image data is analyzed, so as to obtain characteristic data of the gesture image data.

Then, the gesture operation is identified. Specifically, the gesture image data is analyzed, so as to obtain characteristic data of the gesture image data. Here, the characteristic data represent the contour information, the edge information and the like of the gesture operation.

In step 1403, it is judged whether said characteristic data matches with characteristic data of a predetermined gesture, so as to obtain a judgment result.

Then, it is judged whether said characteristic data matches with characteristic data of a predetermined gesture, so as to obtain the judgment result. Here, the predetermined gesture may be set by the user in advance. For example, with reference to FIG. 25, the predetermined gesture may be a gesture shaped like ⌈, ⌉, ⌊, or ⌋.

In step 1404, in case that the judgment result indicates that said characteristic data matches with characteristic data of the predetermined gesture, it is determined that the first gesture operation is detected.

Here, the first gesture operation is an operation moving along the first direction. The first gesture operation is used to adjust the first display window for the first image.

In the embodiment of the disclosure, it is expected to adjust the size of the first display window via the first gesture operation. Accordingly, the first gesture operation is an operation moving along a first direction to determine how to adjust the size of the first display window. With reference to FIG. 25, when the gesture approaches the low right, the first display window will make a timely response. When the gesture moves at an angle of 45 degrees, the low right of the first display window will be pulled inward or outward, making the entire first display window zoom out or zoom in.

In step 1405, the first gesture operation is identified so as to generate an identifying result, wherein the identifying result is an adjusting parameter for adjusting the first display window for the first image.

In the embodiment of the disclosure, said identifying the first gesture operation comprises: identifying whether the change of the first gesture operation is made within a first plane; and/or identifying whether the change of the first gesture operation is made on an axis perpendicular to the first plane.

Here, the first gesture operation is an operation moving along the first direction. Identifying the first gesture operation means identifying the moving direction of the first gesture operation, so as to determine how to adjust the size of the current first display window.

For an example, it is identified whether the change of the first gesture operation is made within a first plane, wherein the first plane may be an interface in parallel with the first image. As such, when the first gesture operation moves within the first plane, the adjusting parameter for adjusting the size of the first display window can be determined. For another example, it is identified whether the change of the first gesture operation is made on an axis perpendicular to the first plane. As such, when the first gesture operation moves within the first plane, the adjusting parameter for zooming in or zooming out the first display window can be determined. Here, when the first display window is zoomed in or zoomed out, the size of the first display window can also be adjusted.

Based on this, the adjusting parameter in the embodiment of the disclosure may be an adjusting parameter for adjusting the size of the first display window, or may be an adjusting parameter for adjusting the distance between the first display window and the lens module.

In step 1406, a first instruction is generated according to the identifying result.

In the embodiment of the disclosure, the first instruction contains information such as the adjusting parameter and the like.

In step 1407, in response to the first instruction, the first display window is adjusted according to the adjusting parameter, so as to generate a second display window.

Here, the second display window and the first window display the same contents.

In the embodiment of the disclosure, if the adjusting parameter is the one for adjusting the size of the first display window, said adjusting the first display window according to the adjusting parameter specifically comprises: determining, according to the adjusting parameter, a first display parameter of the first display window, wherein the first display parameter represents the size of a display area of the first display window; varying the first display window based on the first display parameter, so as to generate the second display window, wherein the second display window and the first window display the same contents; controlling the projection source of the projection unit to emit lights for forming the second display window, so as to make the user view the second display window at the location of the current visual focus. Here, the location of the visual focus is kept unchanged during the adjustment of the size of the first display window, and thus the user can view changes of the size of the first display window at a same visual focus.

In the embodiment of the disclosure, if the adjusting parameter is the one for adjusting the distance between the first display window and the lens module, said adjusting the first display window according to the adjusting parameter specifically comprises: adjusting, according to the adjusting parameter, the location of a visual focus at which the first display window is located, so as to move the first display window located at a first visual focus to the second display window located at a second visual focus; wherein the first visual focus and the second visual focus are both located on a straight line defined by the lens module and the user's eye. Specifically, the location of the visual focus at which the first display window is located can be adjusted by controlling the distance between the projection source of the projection unit and the lens of the lens module and/or controlling the focal length of the lens of the lens module. Here, when the distance between the first display window and the lens module is adjusted, the visual focus changes. As such, the user can view different display windows displaying the same contents at two different visual focuses.

In step 1408, the contents in the first display window are displayed in the second display window.

In the embodiments of the disclosure, the identifying result representing an adjusting parameter for adjusting the first display window for the first image is identified by identifying the first gesture operation. Then, the second display window is generated by adjusting, according to the adjusting parameter, the size of the first display window or the distance between the first display window and the lens module. Then, the contents in the first display window are displayed in the second display window. As such, the user can freely adjust the size of the virtual interface via a gesture, according to different scenarios or user preferences. Such an adjusting method is simple and the user's experience is improved.

Figure 19:
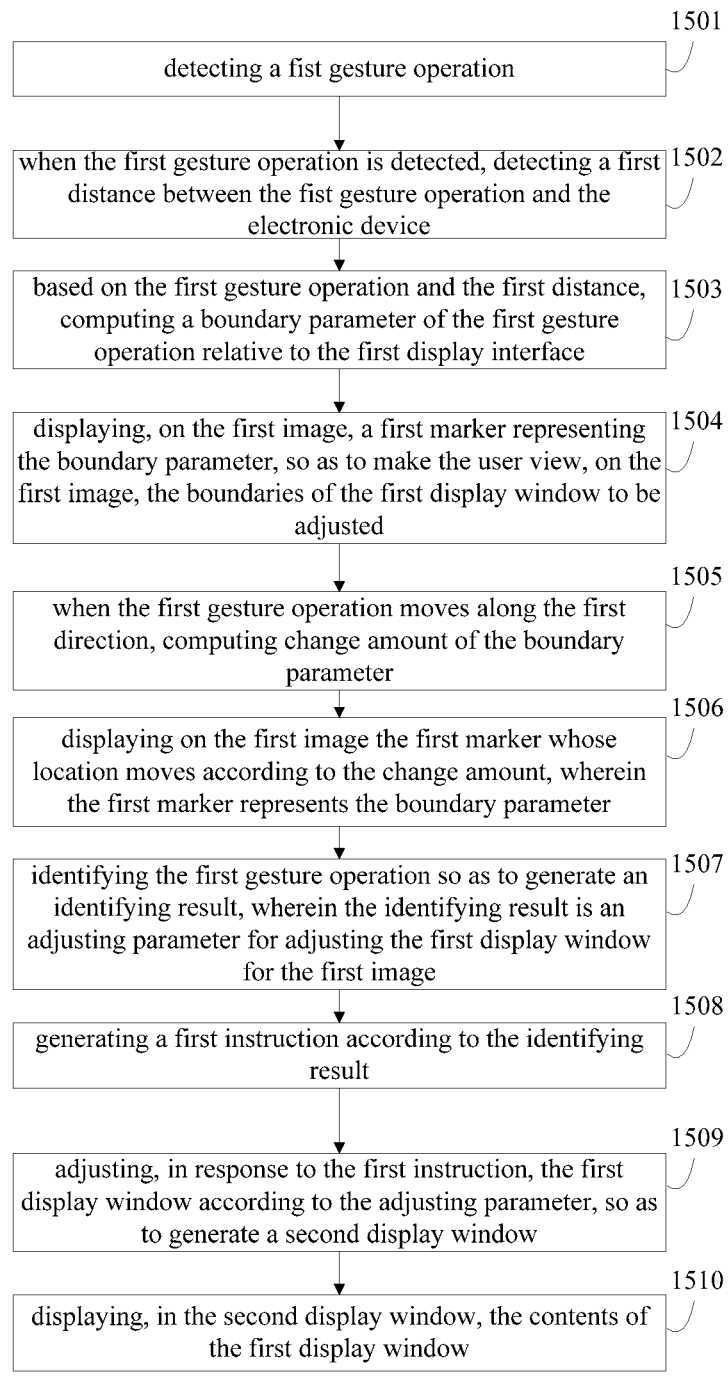
FIG. 19 shows a schematic flowchart illustrating a control method according to a eleventh embodiment of the disclosure.

FIG. 19 shows a schematic flowchart illustrating a control method according to the eleventh embodiment of the disclosure. The control method of the present embodiment can be applied in a portable electronic device. The electronic device comprises a bracket, and a projection unit and a lens module mounted on the bracket. The electronic device is able to maintain its position relative to the head of the user of the electronic device by the bracket. When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image displayed with a default display parameter at the location of a visual focus, wherein the visual focus is located on a straight line defined by the lens module and the user's eye, and the visual focus and the user's eye are located at opposite sides of the lens module. As shown in FIG. 19, said control method comprises the following steps.

In step 1501, a first gesture operation is detected.

Here, the first gesture operation is an operation moving along a first direction, and the first gesture operation is used to adjust a first display window for the first image.

In the embodiment of the disclosure, the portable electronic device may be, for example, smart glasses. With reference to FIG. 13, the electronic device has a bracket. The electronic device can be worn on the head of the user by using the bracket. That is, a first relative position of the electronic device and the user's head is maintained by the bracket. The portable electronic device also has a projection unit and a lens module mounted on the bracket, wherein the projection unit may be implemented as a miniature projector. The projection source of the projection unit may emit lights for forming a first image. Here, the first image may be contents in multimedia forms such as contents in a picture, contents in a video, contents in a document, etc. The lens module is used to change the direction of the light path for emitting the lights from the projection source, so as to project the lights for forming the first image onto the eye of the user of the electronic device, making the user view the first image.

In the embodiment of the disclosure, the lens module at least has a convex lens. With reference to FIG. 14, the convex lens can converge the lights emitted from the projection source. Preferably, the lens module also has a reflection prism. The reflection prism can reflect the lights transmitted through the convex lens onto the user's eye, enabling the retina of the human's eye to feel the lights reflected by the reflection prism. The virtual image formed by the reverse extension lines of the reflected lights is located on point A, which is called as "visual focus" in the embodiment of the disclosure. As such, the user can view the first image on the position of the visual focus through the lens module. As shown in FIG. 14, the visual focus is located on a straight line defined by the lens module and the user's eye, and the visual focus and the user's eye are located at opposite sides of the lens module.

The embodiment of the disclosure intends to adjust the size of the first display window for the first image. Here, the first display window may represent a display window for the whole full screen area of the first image, or may represent some small window within the first image.

With reference to FIG. 25, which shows a schematic diagram of the first image, assume that the first display window the user wants to adjust is the display window for the whole full screen area of the first image. At this time, the user may trigger the portable electronic device to adjust the first display window for the first image via the first gesture operation. Specifically, the camera in the electronic device acquires gesture image data corresponding to the gesture operation. Then, the gesture operation is identified. Specifically, the gesture image data is analyzed, so as to obtain characteristic data of the gesture image data. Here, the characteristic data represent the contour information, the edge information and the like of the gesture operation. Then, it is judged whether said characteristic data matches with characteristic data of a predetermined gesture, so as to obtain a judgment result. Here, the predetermined gesture may be set by the user in advance. For example, with reference to FIG. 25, the predetermined gesture may be a gesture shaped like ⌈, ⌉, ⌊, or ⌋. Finally, in case that the judgment result indicates that said characteristic data matches with characteristic data of the predetermined gesture, it is determined that the first gesture operation is detected.

In the embodiment of the disclosure, it is expected to adjust the size of the first display window via the first gesture operation. Accordingly, the first gesture operation is an operation moving along a first direction to determine how to adjust the size of the first display window. With reference to FIG. 25, when the gesture approaches the low right, the first display window will make a timely response. When the gesture moves at an angle of 45 degrees, the low right of the first display window will be pulled inward or outward, making the entire first display window zoom out or zoom in.

In step 1502, when the first gesture operation is detected, a first distance between the first gesture operation and the electronic device is detected.

In the embodiment of the disclosure, the first distance between the first gesture operation and the electronic device can be detected by a distance sensor. Alternatively, the first distance between the first gesture operation and the electronic device can be detected by a binocular camera.

In step 1503, a boundary parameter of the first gesture operation relative to the first image is computed based on the first gesture operation and the first distance.

In the embodiment of the disclosure, the first gesture operation may be a box made by both hands. The size, i.e. the boundary parameter, of the box is determined based on the first gesture operation and the first distance.

In step 1504, a first marker representing the boundary parameter is displayed on the first image, so as to make the user view, on the first image, the boundaries of the first display window to be adjusted.

Here, the first marker may be a box, or may be four corners defining a box.

In step 1505, when the first gesture operation moves along the first direction, the change amount of the boundary parameter is computed.

In step 1506, the first marker whose location moves according to the change amount is displayed on the first image, wherein the first marker represents the boundary parameter.

In step 1507, the first gesture operation is identified so as to generate an identifying result, wherein the identifying result is an adjusting parameter for adjusting the first display window for the first image.

In the embodiment of the disclosure, said identifying the first gesture operation comprises: identifying whether the change of the first gesture operation is made within a first plane; and/or identifying whether the change of the first gesture operation is made on an axis perpendicular to the first plane.

Here, the first gesture operation is an operation moving along the first direction. Identifying the first gesture operation means identifying the moving direction of the first gesture operation, so as to determine how to adjust the size of the current first display window.

For an example, it is identified whether the change of the first gesture operation is made within a first plane, wherein the first plane may be an interface in parallel with the first image. As such, when the first gesture operation moves within the first plane, the adjusting parameter for adjusting the size of the first display window can be determined. For another example, it is identified whether the change of the first gesture operation is made on an axis perpendicular to the first plane. As such, when the first gesture operation moves within the first plane, the adjusting parameter for zooming in or zooming out the first display window can be determined. Here, when the first display window is zoomed in or zoomed out, the size of the first display window can also be adjusted.

Based on this, the adjusting parameter in the embodiment of the disclosure may be an adjusting parameter for adjusting the size of the first display window, or may be an adjusting parameter for adjusting the distance between the first display window and the lens module.

In the embodiment of the disclosure, the adjusting parameter may also be determined based on the first marker of the boundary parameter.

In step 1508, a first instruction is generated according to the identifying result.

In the embodiment of the disclosure, the first instruction contains information such as the adjusting parameter and the like.

In step 1509, in response to the first instruction, the first display window is adjusted according to the adjusting parameter, so as to generate a second display window.

Here, the second display window and the first window display the same contents.

In the embodiment of the disclosure, if the adjusting parameter is the one for adjusting the size of the first display window, said adjusting the first display window according to the adjusting parameter specifically comprises: determining, according to the adjusting parameter, a first display parameter of the first display window, wherein the first display parameter represents the size of a display area of the first display window; varying the first display window based on the first display parameter, so as to generate the second display window, wherein the second display window and the first window display the same contents; controlling the projection source of the projection unit to emit lights for forming the second display window, so as to make the user view the second display window at the location of the current visual focus. Here, the location of the visual focus is kept unchanged during the adjustment of the size of the first display window, and thus the user can view changes of the size of the first display window at a same visual focus.

In the embodiment of the disclosure, if the adjusting parameter is the one for adjusting the distance between the first display window and the lens module, said adjusting the first display window according to the adjusting parameter specifically comprises: adjusting, according to the adjusting parameter, the location of a visual focus at which the first display window is located, so as to move the first display window located at a first visual focus to the second display window located at a second visual focus; wherein the first visual focus and the second visual focus are both located on a straight line defined by the lens module and the user's eye. Specifically, the location of the visual focus at which the first display window is located can be adjusted by controlling the distance between the projection source of the projection unit and the lens of the lens module and/or controlling the focal length of the lens of the lens module. Here, when the distance between the first display window and the lens module is adjusted, the visual focus changes. As such, the user can view different display windows displaying the same contents at two different visual focuses.

In step 1510, the contents in the first display window are displayed in the second display window.

In the embodiments of the disclosure, the identifying result representing an adjusting parameter for adjusting the first display window for the first image is identified by identifying the first gesture operation. Then, the second display window is generated by adjusting, according to the adjusting parameter, the size of the first display window or the distance between the first display window and the lens module. Then, the contents in the first display window are displayed in the second display window. As such, the user can freely adjust the size of the virtual interface via a gesture, according to different scenarios or user preferences. Such an adjusting method is simple and the user's experience is improved.

Figure 20:
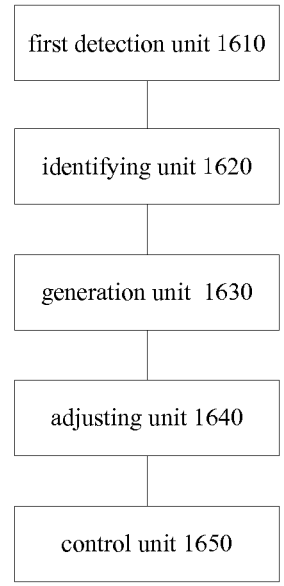
FIG. 20 shows a schematic block diagram of a portable electronic device according to a seventh embodiment of the disclosure.

FIG. 20 shows a schematic block diagram of a portable electronic device according to the seventh embodiment of the disclosure. The electronic device in the present example comprises a bracket, and a projection unit and a lens module mounted on the bracket, the electronic device is able to maintain its position relative to the head of the user of the electronic device by the bracket, When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image at the location of a visual focus, wherein the visual focus is located on a straight line defined by the lens module and the user's eye, and the visual focus and the user's eye are located at opposite sides of the lens module.

The electronic device further comprises:

a first detection unit 1610 configured for detecting a first gesture operation, wherein the first gesture operation is an operation moving along a first direction, and the first gesture operation is used to adjust a first display window for the first image;

a identifying unit 1620 configured for identifying the first gesture operation so as to generate an identifying result, wherein the identifying result is an adjusting parameter for adjusting the first display window for the first image;

a generation unit 1630 configured for generating a first instruction according to the identifying result;

a adjusting unit 1640 configured for adjusting, in response to the first instruction, the first display window according to the adjusting parameter, so as to generate a second display window, wherein the second display window and the first window display the same contents; and a control unit 1650 configured for displaying, in the second display window, the contents in the first display window.

In the embodiment of the disclosure, the identifying unit 1620 is further configured for identifying whether the change of the first gesture operation is made within a first plane and/or identifying whether the change of the first gesture operation is made on an axis perpendicular to the first plane.

Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

Figure 21:
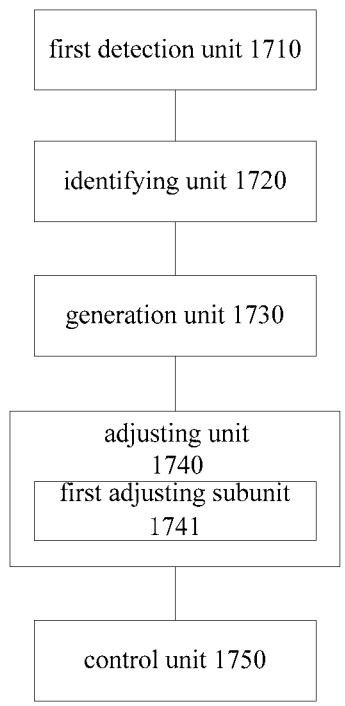
FIG. 21 shows a schematic block diagram of a portable electronic device according to an eighth embodiment of the disclosure.

FIG. 21 shows a schematic block diagram of a portable electronic device according to the eighth embodiment of the disclosure. The electronic device in the present example comprises a bracket, and a projection unit and a lens module mounted on the bracket, the electronic device is able to maintain its position relative to the head of the user of the electronic device by the bracket, When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image at the location of a visual focus, wherein the visual focus is located on a straight line defined by the lens module and the user's eye, and the visual focus and the user's eye are located at opposite sides of the lens module.

The electronic device further comprises:

a first detection unit 1710 configured for detecting a first gesture operation, wherein the first gesture operation is an operation moving along a first direction, and the first gesture operation is used to adjust a first display window for the first image;

a identifying unit 1720 configured for identifying the first gesture operation so as to generate an identifying result, wherein the identifying result is an adjusting parameter for adjusting the first display window for the first image;

a generation unit 1730 configured for generating a first instruction according to the identifying result;

a adjusting unit 1740 configured for adjusting, in response to the first instruction, the first display window according to the adjusting parameter, so as to generate a second display window, wherein the second display window and the first window display the same contents; and a control unit 1750 configured for displaying, in the second display window, the contents in the first display window.

In the embodiment of the disclosure, the identifying unit 1720 is further configured for identifying whether the change of the first gesture operation is made within a first plane and/or identifying whether the change of the first gesture operation is made on an axis perpendicular to the first plane.

Preferably, the adjusting unit 1740 comprises:

a first adjusting subunit 1741, configured for adjusting, according to the adjusting parameter, the location of a visual focus at which the first display window is located, so as to move the first display window located at a first visual focus to the second display window located at a second visual focus; wherein the first visual focus and the second visual focus are both located on a straight line defined by the lens module and the user's eye.

The first adjusting subunit 1741 is further configured for adjusting the location of the visual focus at which the first display window is located by controlling the distance between the projection source of the projection unit and the lens of the lens module and/or controlling the focal length of the lens of the lens module.

Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

Figure 22:
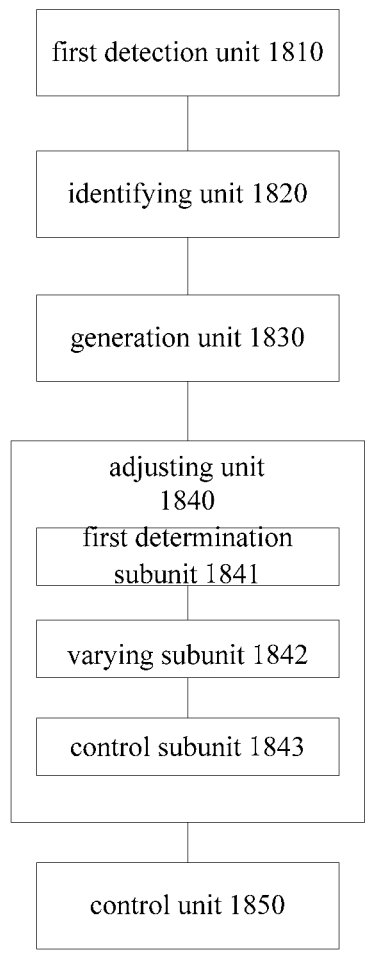
FIG. 22 shows a schematic block diagram of a portable electronic device according to a ninth embodiment of the disclosure.

FIG. 22 shows a schematic block diagram of a portable electronic device according to the ninth embodiment of the disclosure. The electronic device in the present example comprises a bracket, and a projection unit and a lens module mounted on the bracket, the electronic device is able to maintain its position relative to the head of the user of the electronic device by the bracket, When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image at the location of a visual focus, wherein the visual focus is located on a straight line defined by the lens module and the user's eye, and the visual focus and the user's eye are located at opposite sides of the lens module.

The electronic device further comprises:

a first detection unit 1810 configured for detecting a first gesture operation, wherein the first gesture operation is an operation moving along a first direction, and the first gesture operation is used to adjust a first display window for the first image;

a identifying unit 1820 configured for identifying the first gesture operation so as to generate an identifying result, wherein the identifying result is an adjusting parameter for adjusting the first display window for the first image;

a generation unit 1830 configured for generating a first instruction according to the identifying result;

a adjusting unit 1840 configured for adjusting, in response to the first instruction, the first display window according to the adjusting parameter, so as to generate a second display window, wherein the second display window and the first window display the same contents; and a control unit 1850 configured for displaying, in the second display window, the contents in the first display window.

In the embodiment of the disclosure, the identifying unit 1820 is further configured for identifying whether the change of the first gesture operation is made within a first plane and/or identifying whether the change of the first gesture operation is made on an axis perpendicular to the first plane.

Preferably, the adjusting unit 1820 comprises:

a first determination subunit 1841, configured for determining, according to the adjusting parameter, a first display parameter of the first display window, wherein the first display parameter represents the size of a display area of the first display window;

a varying subunit 1842, configured for varying the first display window based on the first display parameter, so as to generate the second display window, wherein the second display window and the first window display the same contents; and a control subunit 1843, configured for controlling the projection source of the projection unit to emit lights for forming the second display window, so as to make the user view the second display window at the location of the current visual focus.

Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

Figure 23:
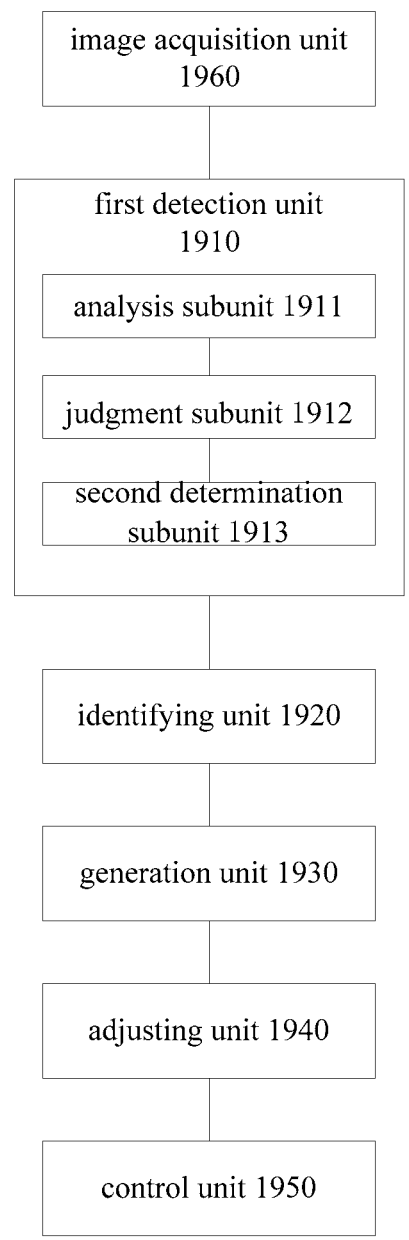
FIG. 23 shows a schematic block diagram of a portable electronic device according to a tenth embodiment of the disclosure.

FIG. 23 shows a schematic block diagram of a portable electronic device according to the tenth embodiment of the disclosure. The electronic device in the present example comprises a bracket, and a projection unit and a lens module mounted on the bracket, the electronic device is able to maintain its position relative to the head of the user of the electronic device by the bracket, When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image at the location of a visual focus, wherein the visual focus is located on a straight line defined by the lens module and the user's eye, and the visual focus and the user's eye are located at opposite sides of the lens module.

The electronic device further comprises:

a first detection unit 1910 configured for detecting a first gesture operation, wherein the first gesture operation is an operation moving along a first direction, and the first gesture operation is used to adjust a first display window for the first image;

a identifying unit 1920 configured for identifying the first gesture operation so as to generate an identifying result, wherein the identifying result is an adjusting parameter for adjusting the first display window for the first image;

a generation unit 1930 configured for generating a first instruction according to the identifying result;

a adjusting unit 1940 configured for adjusting, in response to the first instruction, the first display window according to the adjusting parameter, so as to generate a second display window, wherein the second display window and the first window display the same contents; and a control unit 1950 configured for displaying, in the second display window, the contents in the first display window.

In the embodiment of the disclosure, the identifying unit 1920 is further configured for identifying whether the change of the first gesture operation is made within a first plane and/or identifying whether the change of the first gesture operation is made on an axis perpendicular to the first plane.

Preferably, the electronic device further comprises an image acquisition unit 1960 configured for acquiring gesture image data corresponding to a gesture operation.

The first detection unit 1910 comprises:

an analysis subunit 1911, configured for analyzing the gesture image data, so as to obtain characteristic data of the gesture image data;

a judgment subunit 1912, configured for judging whether said characteristic data matches with characteristic data of a predetermined gesture, so as to obtain a judgment result;

a second determination subunit 1913, configured for, in case that the judgment result indicates that said characteristic data matches with characteristic data of the predetermined gesture, determining that the first gesture operation is detected.

Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

Figure 24:
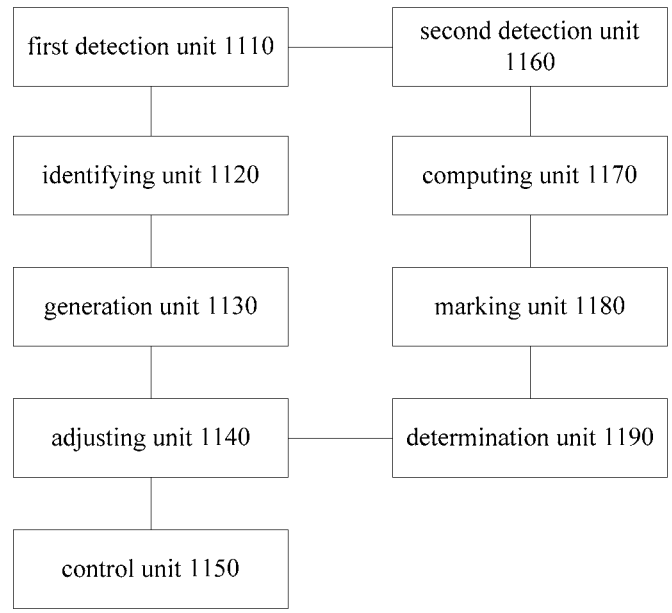
FIG. 24 shows a schematic block diagram of a portable electronic device according to a eleventh embodiment of the disclosure.

FIG. 24 shows a schematic block diagram of a portable electronic device according to the eleventh embodiment of the disclosure. The electronic device in the present example comprises a bracket, and a projection unit and a lens module mounted on the bracket, the electronic device is able to maintain its position relative to the head of the user of the electronic device by the bracket, When the electronic device maintains its position relative to the head of the user of the electronic device by the bracket, the electronic device is controlled to emit lights for forming a first image (e.g., a display interface) from a projection source of the projection unit, the lights being projected onto the user's eye through lens elements of the lens module, so as to make the user view, through the lens module, the first image at the location of a visual focus, wherein the visual focus is located on a straight line defined by the lens module and the user's eye, and the visual focus and the user's eye are located at opposite sides of the lens module.

The electronic device further comprises:

a first detection unit 1110 configured for detecting a first gesture operation, wherein the first gesture operation is an operation moving along a first direction, and the first gesture operation is used to adjust a first display window for the first image;

a identifying unit 1120 configured for identifying the first gesture operation so as to generate an identifying result, wherein the identifying result is an adjusting parameter for adjusting the first display window for the first image;

a generation unit 1130 configured for generating a first instruction according to the identifying result;

a adjusting unit 1140 configured for adjusting, in response to the first instruction, the first display window according to the adjusting parameter, so as to generate a second display window, wherein the second display window and the first window display the same contents; and a control unit 1150 configured for displaying, in the second display window, the contents in the first display window.

In the embodiment of the disclosure, the identifying unit 1120 is further configured for identifying whether the change of the first gesture operation is made within a first plane and/or identifying whether the change of the first gesture operation is made on an axis perpendicular to the first plane.

Preferably, the electronic device further comprises:

a second detection unit 1160, configured for, when the first gesture operation is detected, detecting a first distance between the first gesture operation and the electronic device;

a computing unit 1170, configured for, based on the first gesture operation and the first distance, computing a boundary parameter of the first gesture operation relative to the first image;

a marking unit 1180, configured for displaying, on the first image, a first marker representing the boundary parameter, so as to make the user view, on the first image, the boundaries of the first display window to be adjusted.

The electronic device further comprises:

a determination unit 1190, configured for determining the adjusting parameter based on the first marker of the boundary parameter, wherein the computing unit 1170 is further configured for computing the change amount of the boundary parameter when the first gesture operation moves along the first direction, and wherein the marking unit 1180 is further configured for displaying, on the first image, the first marker whose location moves according to the change amount, wherein the first marker represents the boundary parameter Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

FIGS. 26-29 show schematic diagrams illustrating image processing methods and portable electronic devices (e.g. camera) according to the twelfth to fourteenth embodiments of the disclosure. It should be appreciated that, the methods and devices shown in these figures may be used in connection with the methods and devices described above with reference to the FIGS. 1 to 25, or may be used independent of the methods and devices described above with reference to the FIGS. 1 to 25. The following description will be given for a case wherein the methods and devices shown in these figures are independent of the methods and devices described above with reference to the FIGS. 1 to 25, but it does not exclude that they may be used in connection with the methods and devices described above with reference to the FIGS. 1 to 25.

The twelfth embodiment of the disclosure discloses an image processing method to which the design principle of the first embodiment can be applied. The image processing method can be applied to an electronic device comprising an image acquisition unit and a display unit. The display unit of the electronic device can display images acquired by the image acquisition unit. The electronic device may be a portable electronic device such as a mobile phone, a digital camera, a digital video recorder, a tablet computer, etc. The image processing method can ensure the user view the prompt information clearly by adjusting the color parameter of the prompt information after the prompt information has been generated by the electronic device.

Figure 26:
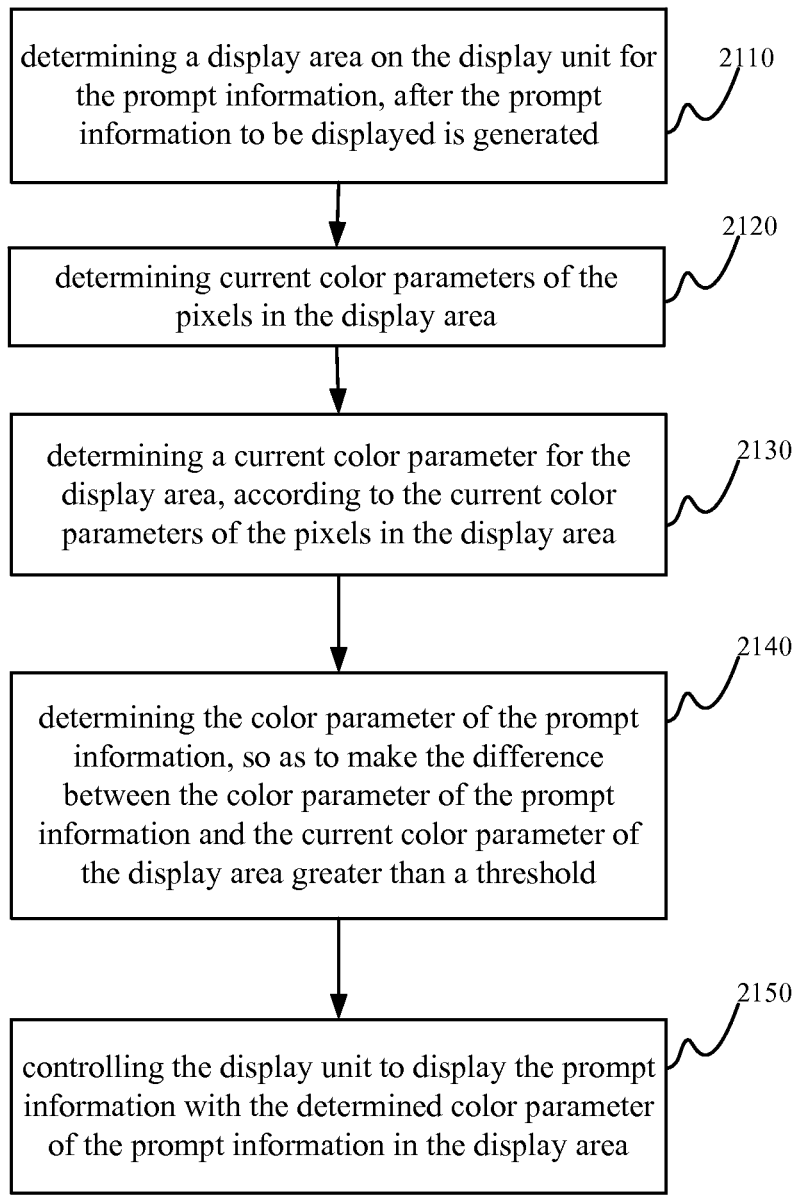
FIG. 26 shows a schematic flowchart illustrating an image processing method according to a twelfth embodiment of the disclosure.

FIG. 26 shows a flowchart of an image processing method disclosed by the disclosure. As shown in FIG. 26, the image processing method comprises the following steps.

In step 2110, a display area on the display unit for the prompt information is determined, after the prompt information to be displayed is generated. This step may correspond to step 201 in the first embodiment in which a second image of a target object is acquired.

After the electronic device generates prompt information, the generated prompt information should be displayed on the display unit, in order to prompt a user. In an implementation, the location for displaying the prompt information may be an original setting in the electronic device, or may be set by the user. In addition, the prompt information may be displayed in a fixed area on the display unit. Alternatively, it is possible that different pieces of prompt information are set as being displayed in different areas on the display unit. After the electronic device generates the prompt information, the display area on the display unit for the prompt information should be determined.

In step 2120, current color parameters of the pixels in the display area are determined.

In step 2130, a current color parameter of the display area is determined according to the current color parameters of the pixels in the display area.

The above two steps may correspond to step 202 in the first embodiment in which the second image is analyzed to determine a second display parameter of the second image.

An area on the display unit comprises a large number of pixels. The color parameter of the area is determined by the color parameters of the pixels in the area. Thus, first, the current color parameters of the pixels in the display area on the display unit are determined, and then the current color parameter of the display area is determined according to the current color parameters of the pixels in the display area.

It should be noted that, the user may describe the color of an image, or of an area in the image, generally by the words "black", "white", "yellow", "red", "green", "blue" and the like, or specifically by the phrase "rose", "pink", "light green", "bright yellow" and the like. However, the electronic device describes the color of an image, or of an area in the image, with a quantized color parameter, which may comprise a set of parameters. For example, a color parameter may comprise brightness of red lights, brightness of green lights and brightness of blue lights. Alternatively, a color parameter may comprise hue, brightness and saturation. For an electronic device, it can be considered that another color is generated when any parameter in the set of color parameters changes. However, for a user, he/she may not able to perceive, by his/her eyes, the color difference when one or more parameters in the set of color parameters change slightly. The user is able to perceive the color change only when the one or more parameters in the set of color parameters change significantly. It should also be noted that, since the color parameter may comprises a set of color parameters, the comparison between colors in the disclosure should be interpreted as comparisons between respective parameters in the respective sets of color parameters. Accordingly, the feature "the difference between the color parameter of the prompt information and the current color parameter of the display area greater than a threshold" as described below should be interpreted as "the differences between at least one respective color in the color parameter set for the prompt information and the current color parameter set for the display area greater than respective thresholds."

In step 2140, the color parameter of the prompt information is determined, so as to make the difference between the color parameter of the prompt information and the current color parameter of the display area greater than a threshold. This step may correspond to step 203 in the first embodiment, in which a first display parameter of the first image is determined based on the second display parameter of the second image, so as to make the difference between the first display parameter of the first image and the second display parameter of the second image greater than a threshold.

After the the current color parameter of the display area is determined, the color parameter of the prompt information is determined based on the current color parameter of the display area to make the difference between the color parameter of the prompt information and the current color parameter of the display area greater than a threshold, so that the user can perceive the color difference between the prompt information and the display area. In an implementation, the threshold may be set to a relative large numerical value. In such as case, from the view of a user, the difference between the color of the prompt information and the color of the corresponding display area on the display unit is more obvious. Certainly, in case that the difference between each parameter in the set of color parameters for the prompt information and each corresponding parameter in the set of the color parameters for the display area is greater than a threshold, the difference between the color of the prompt information and the color of the corresponding display area on the display unit is even more obvious.

In step 2150, the display unit is controlled to display the prompt information with the determined color parameter of the prompt information in the display area.

In the image processing method disclosed in the disclosure, first, a display area on the display unit for the prompt information is determined, after the prompt information to be displayed is generated. Then, current color parameters of the pixels in the display area are determined, and a current color parameter of the display area is determined according to the current color parameters of the pixels in the display area. Subsequently, the color parameter of the prompt information is determined based on the current color parameter of the display area, so as to make the difference between the color parameter of the prompt information and the current color parameter of the display area greater than a threshold. Subsequently, the display unit is controlled to display the prompt information with the determined color parameter in the display area. Based on the image processing method disclosed in the disclosure, the color parameter of the prompt information is not fixed, but depends on the color parameter of its display area on the display unit. In addition, the difference between the color parameter of the prompt information and the color parameter of the display area are greater than the threshold, which results in a greater difference in color between the prompt information and the display area, ensuring that the user can view the prompt information clearly.

Here, it should be noted that the color parameter may comprise brightness of red lights, brightness of green lights and brightness of blue lights. Accordingly, in the flowchart shown in FIG. 26, determining the current color parameters of the pixels in the display area specifically comprises: determining current brightness of red lights, current brightness of green lights and current brightness of blue lights for the pixels in the display area. Determining the current color parameter of the display area according to the current color parameters of the pixels in the display area specifically comprises: determining current brightness of red lights, current brightness of green lights and current brightness of blue lights for the display area based on the current brightness of red lights, current brightness of green lights and current brightness of blue lights for the pixels in the display area. Determining the color parameter of the prompt information specifically comprises: determining brightness of red lights, brightness of green lights and brightness of blue lights for the prompt information.

In addition, the color parameter may comprise hue, brightness or saturation. Accordingly, in the flowchart shown in FIG. 26, determining the current color parameters of the pixels in the display area specifically comprises determining current hue, brightness or saturation for the pixels in the display area. Determining the current color parameter of the display area according to the current color parameters of the pixels in the display area specifically comprises: determining current hue, brightness or saturation for the display area based on the current hue, brightness or saturation for the pixels in the display area. Determining the color parameter of the prompt information specifically comprises: determining hue, brightness or saturation for the prompt information.

Figure 27:
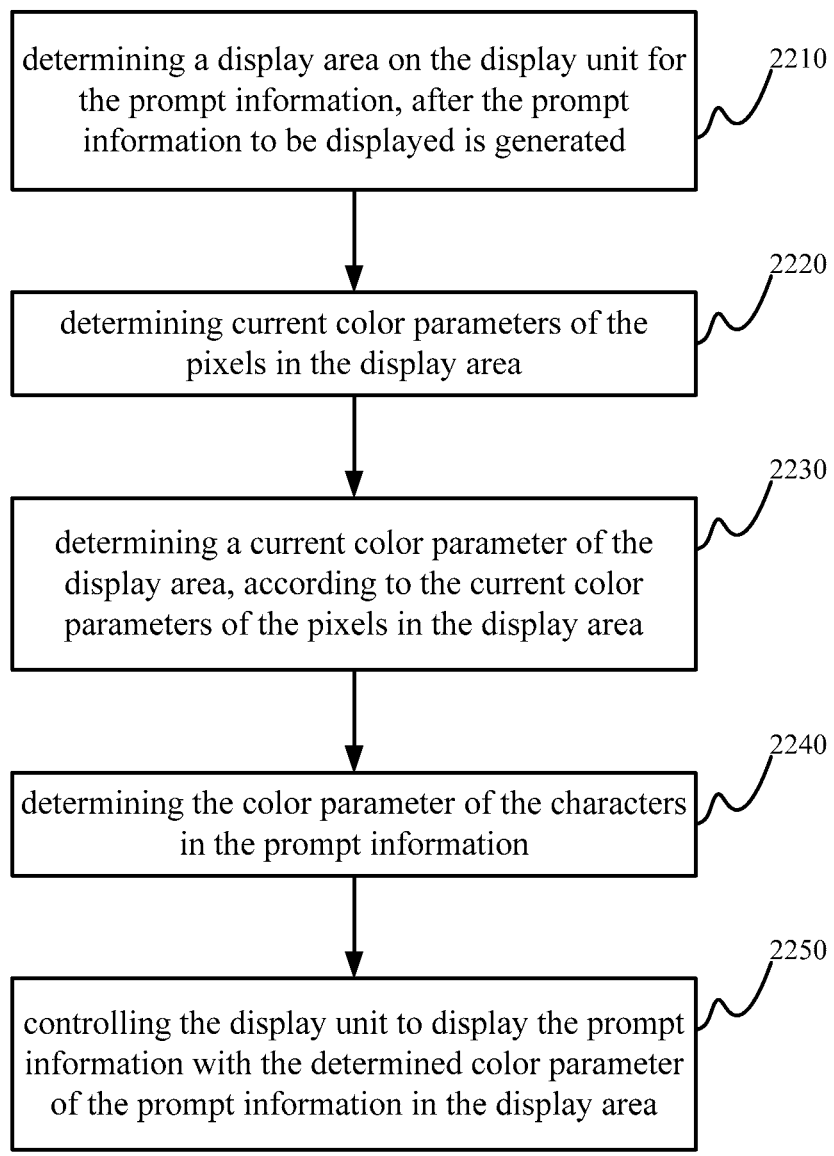
FIG. 27 shows a schematic flowchart illustrating an image processing method according to a thirteenth embodiment of the disclosure.

FIG. 27 shows a flowchart of another image processing method disclosed by the thirteenth embodiment of the disclosure. As shown in FIG. 27, the image processing method comprises the following steps.

In step 2210, a display area on the display unit for the prompt information is determined, after the prompt information to be displayed is generated.

In step 2220, current color parameters of the pixels in the display area are determined.

In step 2230, a current color parameter of the display area is determined according to the current color parameters of the pixels in the display area.

In step 2240, the color parameter of the characters in the prompt information is determined, so as to make the difference between the color parameter of the characters and the current color parameter of the display area greater than a threshold.

In step 2250, the display unit is controlled to display the prompt information with the determined color parameter of the prompt information in the display area.

In the image processing method shown in FIG. 27, after the current color parameter of the display area on the display unit is determined, the color parameter of the characters in the prompt information is determined according to the current color parameter of the display area, so as to make a greater difference in color between the characters in the prompt information and the display area, which can ensure that the user view the prompt information clearly.

Figure 28:
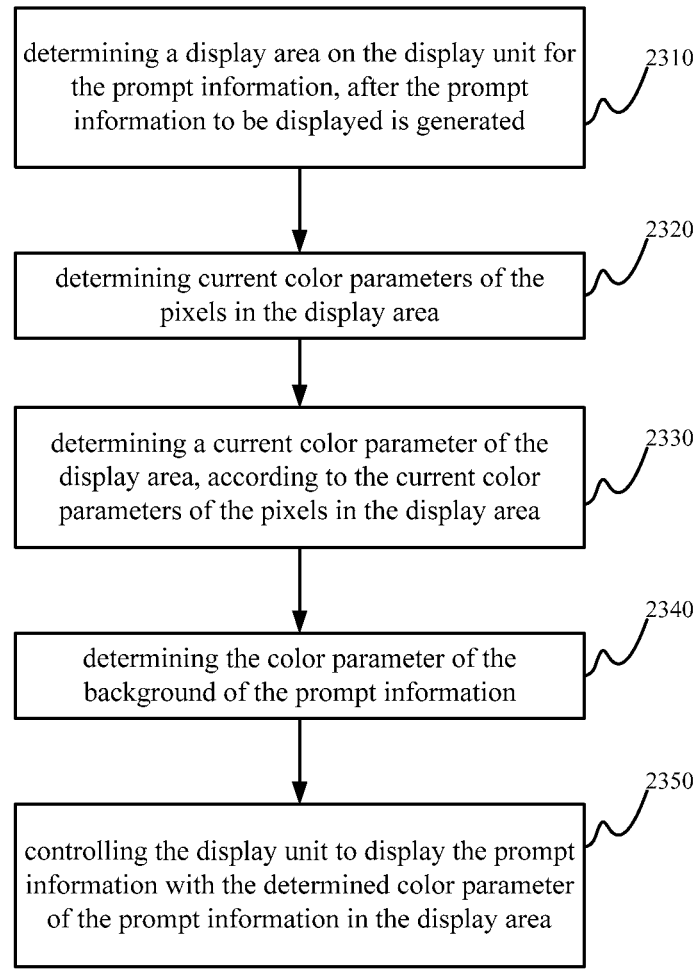
FIG. 28 shows a schematic flowchart illustrating an image processing method according to a fourteenth embodiment of the disclosure.

FIG. 28 shows a flowchart of another image processing method disclosed by the fourteenth embodiment of the disclosure. As shown in FIG. 28, the image processing method comprises the following steps.

In step 2310, a display area on the display unit for the prompt information is determined, after the prompt information to be displayed is generated.

In step 2320, current color parameters of the pixels in the display area are determined.

In step 2330, a current color parameter of the display area is determined according to the current color parameters of the pixels in the display area.

In step 2340, the color parameter of the background of the prompt information is determined, so as to make the difference between the color parameter of the background and the current color parameter of the display area greater than a threshold and the difference between the color parameter of the background and the color parameter of the characters in the prompt information greater than a threshold.

In an implementation, the color parameter of the characters in the prompt information may be set in advance. For example, a user may define the color parameter of the characters in the prompt information according to his/her preferences. After the prompt information to be displayed is generated and the current color parameter of the display area on the display unit is determined, the color parameter of the background of the prompt information is determined based on the current color parameter of the display area and the color parameter of the characters, so as to make the difference between the color parameter of the background and the current color parameter of the display area greater than a threshold and the difference between the color parameter of the background and the color parameter of the characters in the prompt information greater than a threshold at the same time.

In step 2350, the display unit is controlled to display the prompt information with the determined color parameter of the prompt information in the display area.

In the image processing method shown in FIG. 28, the difference between the color parameter of the background and the color parameter of the display area is greater than a threshold, while the difference between the color parameter of the background and the color parameter of the characters is greater than a threshold. For a user, he/she can not only view the characters in the prompt information clearly, but also have an improved user experience caused by the complementary color effect formed by the background of the prompt information and the corresponding display area on the display unit.

In the image processing methods shown in FIGS. 27 and 28, the color parameter may comprise brightness of red lights, brightness of green lights and brightness of blue lights, or may comprise hue, brightness or saturation.

In addition, in the image processing method disclosed above in the disclosure, determining the current color parameter of the display area according to the current color parameters of the pixels in the display area may comprise:

obtaining an average value of the current color parameters of pixels in the second image; and determining the average value as the current color parameter of the display area.

It should be noted that the average value of the color parameter may also comprise a set of parameters. For example, in case that the color parameter comprises brightness of red lights, brightness of green lights and brightness of blue lights, the average value of the color parameter comprises average values of brightness of red lights, brightness of green lights and brightness of blue lights. In case that the color parameter comprises hue, brightness and saturation, the average value of the color parameter comprises average values of hue, brightness and saturation.

In an implementation, if an electronic device is equipped with a GPU (Graph Processing Unit), the average value of the color parameters for the pixels in the display area may be computed by the GPU.

GPU collects the current color parameters for the pixels in the display area, and computes average values of respective parameters, which form the average values of the current color parameters of the pixels. In order to reduce the operations, GPU may perform a sampling in the display area, collect only the color parameters of part of the pixels, and then compute the average value of the respective sampled pixels. For example, GPU may sample several pixels uniformly in the display area on the display unit, collect brightness of red lights, brightness of green lights and brightness of blue lights for the sampled pixels, and then compute the average values of brightness of red lights, brightness of green lights and brightness of blue lights for the respective pixels.

The foregoing discloses image processing method applied to electronic devices. Accordingly, the disclosure also provides image processing apparatus applied in electronic devices.

Figure 29:
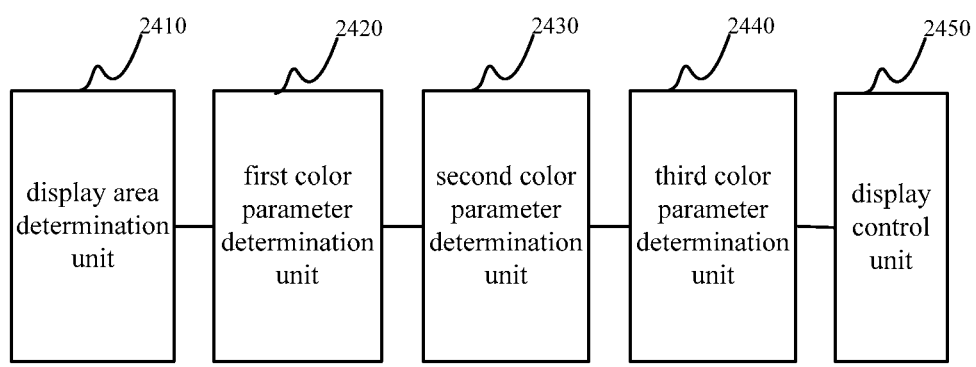
FIG. 29 shows a schematic block diagram of an image processing apparatus disclosed by the disclosure.

FIG. 29 shows a schematic block diagram of an image processing apparatus disclosed by the disclosure. The image processing apparatus comprises a display area determination unit 2410, a first color parameter determination unit 2420, a second color parameter determination unit 2430, a third color parameter determination unit 2440, and a display control unit 2450.

The display area determination unit 2410 is configured for determining a display area on the display unit for the prompt information, after the prompt information to be displayed is generated.

The first color parameter determination unit 2420 is configured for determining current color parameters of the pixels in the display area. The color parameter comprises a set of parameters. For example, a color parameter may comprise brightness of red lights, brightness of green lights and brightness of blue lights. Alternatively, a color parameter may comprise hue, brightness and saturation.

The second color parameter determination unit 2430 is configured for determining a current color parameter of the display area according to the color parameters of the pixels. An area on the display unit comprises a large number of pixels. The color parameter of the area is determined by the color parameters of the pixels in the area. Thus, first, the current color parameters of the pixels in the display area on the display unit are determined, and then the current color parameter of the display area is determined according to the current color parameters of the pixels in the display area.

The third color parameter determination unit 2440 is configured for determining the color parameter of the prompt information, so as to make the difference between the color parameter of the prompt information and the current color parameter of the display area greater than a threshold.

In an implementation, the threshold may be set to a relative large numerical value. In such as case, from the view of a user, the difference between the color of the prompt information and the color of the corresponding display area on the display unit is more obvious. Certainly, in case that the difference between each parameter in the set of color parameters for the prompt information and each corresponding parameter in the set of the color parameters for the display area is greater than a threshold, the difference between the color of the prompt information and the color of the corresponding display area on the display unit is even more obvious.

The display control unit 2450 is configured for controlling the display unit to display, in the display area, the prompt information with the color parameter determined by the third color parameter determination unit.

The image processing apparatus determines the color parameter of the prompt information according to the color parameter of the display area on the display unit for the prompt information. Thus, the color parameter of the prompt information is not fixed. In addition, the difference between the color parameter of the prompt information and the color parameter of the display area are greater than the threshold, which results in a greater difference in color between the prompt information and the display area, ensuring that the user can view the prompt information clearly.

As an implementation, the third color parameter determination unit 2440 comprises a first color parameter determination module. The first color parameter determination module is configured for determining the color parameter of the characters in the prompt information, so as to make the difference between the color parameter of the characters and the current color parameter of the display area greater than a threshold. Based on such an implementation, there is a greater difference between the color of the characters in the prompt information and the color of the display area, ensuring that the user can view the prompt information clearly.

As another implementation, the third color parameter determination unit 2440 comprises a second color parameter determination module. The second color parameter determination module is configured for determining the color parameter of the background of the prompt information, so as to make the difference between the color parameter of the background and the current color parameter of the display area greater than a threshold and the difference between the color parameter of the background and the color parameter of the characters in the prompt information greater than a threshold. Based on such an implementation, the user can not only view the characters in the prompt information clearly, but also have an improved visual experience caused by the complementary color effect formed by the background of the prompt information and the corresponding display area on the display unit.

In the image processing apparatus disclosed above, there may be several ways for the second color parameter determination unit 2430 to determine a current color parameter of the display area according to the color parameters of the pixels in the display area, one of which will be illustrated here. The second color parameter determination unit 2430 may comprise a third color parameter determination module. The third color parameter determination module is configured for obtaining an average value of the current color parameters of the pixels in the display area, and then determining the average value as the current color parameter of the display area.

The disclosure further discloses an electronic device. The electronic device comprises an image acquisition unit and a display unit. The display unit can display images acquired by the image acquisition unit. In addition, the electronic device further comprises an image processing apparatus disclosed above in the disclosure. For the electronic device of the disclosure, when the prompt information is being displayed on the display unit, there is a greater difference in color between the prompt information and the corresponding area in the display area, which can ensure the user view the prompt information clearly.

Finally, it should be further noted that, herein, the relational terms such as "first" and "second", or the like, are merely used to distinguish one entity or operation from another entity or operation, not necessarily requiring or implying there actually exists any such relationship or order among these entities or operations. Moreover, the terms "comprising", "including" or any other variation thereof, are intended to cover a non-exclusive inclusion, such that a process, method, article or device comprising a series of elements includes not only those elements, but also other elements not expressly listed, or further includes inherent elements in such process, method, article or device. In the absence of more restrictive, the element defined by the statement "comprising/including a" does not exclude the existence of additional identical elements in the process, method, article or device comprising said element.

Various embodiments of the present specification are described in a progressive manner. The description of each of the embodiments is focused on portions of the discussed embodiment different from other embodiments. The same or similar portions among respective embodiments can be referenced with each other. The apparatus disclosed by respective embodiments correspond to the methods disclosed by the respective embodiments. Thus, the description of these apparatus is relatively simple. Further description of these apparatus can be understood with referenced to the corresponding parts of the description of the methods.

Those skilled in the art should appreciated that, functions realized by respective units of the portable electronic device according to the embodiment of the disclosure can be understood with reference to respective descriptions of the control methods described above. Functions of the respective units of the portable electronic device according to the embodiment of the disclosure can be implemented by programs executed on a processor, or implemented in specific logic circuits.

The solutions recited in the embodiments of the disclosure can be combined in any form without confliction.

It should be understood that, in the embodiments provided in the disclosure, the methods and smart devices disclosed can be implemented in other ways. The device embodiments described above is just for illustrating. For example, the dividing of the units are just logic partitioning. There may be other dividing means in actual implementations. For example, a plurality of units or components may be combined, or may be incorporated into another system. Alternatively, some features can be omitted or not executed. In addition, the coupling, or the direct coupling, or the communicative connections between the components shown or discussed above can be indirect coupling or communicative connections via some interfaces between the devices or units, and may be electronic, mechanical or in other forms.

The units illustrated as separate components in above may be either physically separate or not. The components shown as a unit may be either a physical unit or not, i.e. may be collocated, or distributed over a plurality of network elements. Some or all of the units may be chosen as required, in order to realize the aim of the present embodiments of the disclosure.

In addition, respective functionality units of respective embodiments of the disclosure may be incorporated into one second processing unit. Alternatively, each of them can be implemented as a separate unit, or two or more of them may be incorporated into a unit. The incorporated unit described above may be implemented in hardware, or implemented in hardware combined with software functionality units.

The above described specific embodiments of the disclosure are intended to be examples only rather than limiting the protection scope of the disclosure. Those skilled in the art may affect that modifications and alternations without departing from the scope of the disclosed technology of the application should be embraced in the protection scope of the disclosure.

We claim:

1. An information processing method, comprising:
    acquiring a second image;
    analyzing the second image to determine a second display parameter of the second image;
    determining; based on the second display parameter of the second image, a first display parameter of a display content to be presented so as to make the difference between the first display parameter for the display content and the second display parameter for the second image greater than a threshold; and
    presenting the display content with the first display parameter,
    wherein the first display parameter and the second display parameter respectively represent color information, the display content have a default display parameter, and the method further comprises:
    comparing the default display parameter with the second display parameter, so as to obtain a first comparison result;
    in case that the first comparison result indicates that the difference between the default display parameter and the second display parameter is less than or equal to a first predetermined value, adjust the default display parameter of the display content to the first display parameter, in order to make the difference between the first display parameter of the display content and the second display parameter of the second image greater than or equal to the first predetermined value.

2. The information processing method of claim 1, the method further comprising:
    determining a display area in which the difference between the second display parameter and the first display parameter is greater than a threshold; and
    displaying the display content in the display area.

3. The information processing method of claim 1, wherein, said analyzing the second image to determine a second display parameter of the second image comprises:
    obtaining average value of color parameters of pixels in the second image; and
    determining the average value as the second display parameter of the second image.

4. The information processing method of claim 1, wherein, said presenting the display content with the first display parameter comprises:
    emitting, from a projection unit of an electronic device, lights for forming the display content, which are projected onto a lens module of the electronic device, so as to make a user view the display content presented with the first display parameter.

5. The information processing method of claim 1, further comprising:
    detecting a first gesture operation moving along a first direction;
    identifying the first gesture operation to determine an adjusting parameter for adjusting the display content; and
    generating an adjusting instruction based on the adjusting parameter; in response to the adjusting instruction, emitting, from a projection unit of an electronic device, lights for forming the display content according to the adjusting parameter, the lights being projected onto a lens module of the electronic device so as to make the user view the adjusted display content at an visual focus, wherein the visual focus is the imaging location of the display content viewed by a user through the lens module.

6. The information processing method of claim 5, further comprising:
    moving the display content from a first visual focus to a second visual focus, according to the adjusting parameter; and
    controlling the projection unit to emit lights for forming the display content, so as to the user view the display content at the second visual focus.

7. The information processing method of claim 6, wherein, said moving the display content from a first visual focus to a second visual focus comprises:
controlling the distance between a projection source of the projection unit and the lens of the lens module; so as to move the display content from the first visual focus to the second visual focus, or changing a focal length of the lens of the lens module, so as to move the display content from the first visual focus to the second visual focus.

8. The information processing method of claim 5, further comprising:
adjusting a size of the display content according to the adjusting parameter.

9. The information processing method of claim 5, further comprising:
detecting a first distance between the first gesture operation and the electronic device;
computing a boundary parameter of the first gesture operation relative to the display content, based on the first gesture operation and the first distance;
displaying a marker for indicating the boundary of the display content, according to the boundary parameter;
detecting the amount of movement of the first gesture operation along the first direction;
computing a change amount of the boundary parameter; and
displaying the adjusted display content according to the change amount.

10. An electronic device, comprising:
an image acquisition unit, configured for acquiring a second image; and
a processor, configured for:
analyzing the second image to determine a second display parameter of the second image;
determining, based on the second display parameter of the second image, a first display parameter of a display content to be presented so as to make the difference between the first display parameter for the display content and the second display parameter for the second image greater than a threshold; and
presenting the display content with the first display parameter,
in case that the first display parameter and the second display parameter respectively comprise color information, the display content have a default display parameter, and the processor is further configured for:
comparing the default display parameter with the second display parameter, so as to obtain a first comparison result;
in case that the first comparison result indicates that the difference between the default display parameter and the second display parameter is less than or equal to a first predetermined value, adjust the default display parameter of the display content to the first display parameter, in order to make the difference between the first display parameter of the display content and the second display parameter of the second image greater than or equal to the first predetermined value.

11. The electronic device of claim 10, wherein, the processor is further configured for:
superimposing the display content displayed with a default display parameter and the second image displayed with the second display parameter, so as to obtain a default superimposed image;
displaying the default superimposed image in a preview mode; and
determining the first display parameter of the display content according to a first operation when the first operation is obtained,
wherein the first operation is used to adjust the default display parameter of the display content to the first display parameter.

12. The electronic device of claim 10, wherein, the processor is further configured for:
obtaining an average value of color parameters of pixels in the second image; and
determining the average value as the second display parameter of the second image.

13. The electronic device of claim 10, further comprising a projection unit, a lens module, a bracket for maintaining the position relative to the head of the user of the electronic device, in case that the electronic device maintains a first position relative to the head of the user by the bracket, the electronic device is controlled to emit, from a projection source of the projection unit, lights for forming the display content, the lights being projected onto the lens elements of the lens module, so as to make the user view the display content at an visual focus through the lens module, wherein the visual focus is located on a straight line defined by the lens module and the user's eye, and the processor is further configured for:
emitting, from the projection unit of the electronic device, lights for forming the display content, the light being projected onto the lens of the electronic device, so as to make the user view the display content presented with the first display parameter.

14. The electronic device of claim 13, wherein, the processor is further configured for:
detecting a first gesture operation moving along a first direction;
identifying the first gesture operation to determine an adjusting parameter for adjusting the display content;
generating an adjusting instruction based on the adjusting parameter; and
in response to the adjusting instruction, emitting, from the projection unit of the electronic device, lights for forming the display content according to the adjusting parameter, the lights being projected onto the lens module of the electronic device so as to make the user view the adjusted display content at an visual focus, wherein the visual focus is the imaging location of the display content viewed by the user through the lens module.

15. The electronic device of claim 14, wherein, the processor is further configured for:
according to the adjusting parameter, controlling the distance between the projection source of the projection unit and the lens of the lens module, or changing a focal length of the lens of the lens module, so as to move the display content from the first visual focus to the second visual focus, and controlling the projection unit to emit lights for forming the display content, so as to make the user view the display content at the second visual focus; or
according to the adjusting parameter, adjusting a size of the display content.

16. The electronic device of claim 14, wherein, the processor is further configured for:
detecting a first distance between the first gesture operation and the electronic device;
based on the first gesture operation and the first distance, computing a boundary parameter of the first gesture operation relative to the display content;

displaying a marker for indicating the boundary of the display content according to the boundary parameter;

detecting the amount of movement of the first gesture operation along the first direction, computing a change amount of the boundary parameter; and displaying the adjusted display content according to the change amount.

17. The electronic device of claim 14, wherein, the processor is further configured for:

identifying whether a change of the first gesture operation is made within a first plane; and/or identifying whether the change of the first gesture operation is made on an axis perpendicular to the first plane.

* * * * *